(12) United States Patent  (10) Patent No.: US 7,882,864 B2
Fargeot  (45) Date of Patent: Feb. 8, 2011

(54) TREE PRUNING AND TRIMMING HEAD

(76) Inventor: Raymond Fargeot, 408, rue Miller, Granby, Quebec (CA) J2G 9J6

( * ) Notice: Subject to any disclaimer, the term of this patent is extended or adjusted under 35 U.S.C. 154(b) by 40 days.

(21) Appl. No.: 12/068,873

(22) Filed: Feb. 13, 2008

(65) Prior Publication Data

US 2008/0196790 A1    Aug. 21, 2008

(51) Int. Cl.
*A01G 23/095* (2006.01)
(52) U.S. Cl. .................................. 144/4.1; 144/34.1
(58) Field of Classification Search ................. 144/4.1, 144/34.1, 34.5, 24.13, 208.1, 208.2; 30/379, 30/379.5; 83/928; 414/444, 450, 688, 729, 414/731; 56/10.1, 14.7
See application file for complete search history.

(56) References Cited

U.S. PATENT DOCUMENTS

| | | | | | |
|---|---|---|---|---|---|
| 3,389,728 | A | * | 6/1968 | Galis | 144/34.1 |
| 4,063,359 | A | * | 12/1977 | Luscombe | 30/379.5 |
| 4,281,693 | A | * | 8/1981 | Moulson | 144/34.1 |
| 5,201,350 | A | * | 4/1993 | Milbourn | 144/24.13 |
| 5,727,610 | A | * | 3/1998 | Isley | 144/4.1 |
| 6,408,906 | B1 | * | 6/2002 | Moon et al. | 144/24.13 |
| 6,962,178 | B2 | * | 11/2005 | Duval | 144/3.1 |

* cited by examiner

*Primary Examiner*—Shelley Self

(57) ABSTRACT

An apparatus for gripping a tree, the apparatus being attachable to a carrier boom, the apparatus being usable with a cutting device for cutting a portion of the tree, the apparatus comprising: a body, the body being mountable to the carrier boom; a pair of gripper arms mounted to the body, the pair of gripper arms being selectively movable between an open configuration in which the tree is insertable therebetween and a closed configuration in which the pair of gripper arms is able to grip the tree therebetween; and a support arm operatively coupled to the body for supporting the cutting device, the support arm including a cutting device mount for mounting the cutting device thereto, the support arm being configured, sized and operatively coupled to the body in a manner such that the cutting device is rotatable relatively to the pair of gripper arms about three different rotation axes; whereby, when the pair of gripper arms grips the tree, the pair of gripper arms stabilizes the support arm relatively to the tree and allows for the orientation of the cutting device relatively to the tree by the support arm. It is a general object of the present invention to provide a new and improved hydraulic tree pruning and trimming head attachment, hereinafter abbreviated simply as head attachment.

20 Claims, 28 Drawing Sheets

TREE PRUNING AND TRIMMING HEAD

FIELD OF THE INVENTION

The present invention relates generally to a tree pruning and trimming device and, more particularly, to a hydraulic tree pruning and trimming head that is typically coupled to, for example, the distal end of an articulated carrier boom mounted on a self-powered vehicle.

BACKGROUND OF THE INVENTION

The prior art proposes numerous devices that offer means for remotely executing operations such as cutting, trimming and/or pruning trees. These devices typically comprise at least a tree cutting means, such as a power chain saw, round saw or band saw mechanism attached to the outer end of a mobile boom mounted on a self-powered vehicle, or the like. Other prior art devices further comprise a tree holding means for grasping the portion of the branch or trunk of a tree destined to be cut and, once it is cut, for manipulating the latter up to a desired location nearby.

While these prior art devices can generally fulfill the main objective of enabling an operator standing at a safe distance from the operation to remotely cut, trim and/or prune a tree, they also offer disadvantages that will be described hereinafter using typical prior art examples.

U.S. Pat. No. 4,063,359, to A. J. Luscombe (1977), proposes a vehicle mounted boom apparatus having a chain saw mechanism mounted thereon and being mounted for shifting movement about a plurality of axes relative to the boom apparatus. Although this device may allow appreciable dexterity in reaching and cutting a branch on a standing tree, it does not offer a clamping means for stably holding the branch while it is being cut, or for manipulating the latter once it is cut away from the tree.

U.S. Pat. No. 4,281,693, to D. C. Moulson (1981), proposes a typical hydraulic feller head attachment which offers a cutting means coupled to a tree clamping means, here represented by a pair of gripping arms encased in a substantially U-shaped housing. While being effective at stably holding the branch or trunk of a tree during the cutting and subsequent handling operations, the cut is invariably at a right angle relative to the longitudinal axis of the branch or trunk, as well as immediately adjacent the gripping arms. These last two characteristics are not necessarily practical in specific trimming and pruning operations on a tree since there are some occasions where the cut must be made at a particular angle and distance relative to the gripping arms assembly. It is to be noted that this type of feller head is often encountered in the tree harvesting industry, and usually comprises additional feeder and delimbing means directly coupled to the head attachment.

U.S. Pat. No. 3,389,728, to A. J. Calis (1968), proposes a tree cutting means and a tree holding means attached to the outer ends of two individually operated carrier booms. Although this approach potentially overcomes the disadvantages of the two prior art devices described above, one skilled in the art readily realizes the difficulty raised by the delicate task of operating the two articulated booms individually or simultaneously. The task gets delicate even more so when the cutting means has to cut an horizontal branch on the opposite side of the holding means, in a crisscrossed configuration with the latter.

Furthermore, a common disadvantage of the prior art is a head attachment which do not offers much in terms of error margins to the operator when the latter has to precisely align a slightly wobbling head attachment against a branch, particularly when the articulated carrier boom is stretched to its full extent to reach high in a tree.

Against this background, there exist a need for a new and improved tree pruning and trimming head that avoids the aforementioned disadvantages.

It is a general object of the present invention to provide such a tree pruning and trimming head.

SUMMARY OF THE INVENTION

In a first broad aspect, the invention provides an apparatus for gripping a tree, the apparatus being attachable to a carrier boom, the apparatus being usable with a cutting device for cutting a portion of the tree, the apparatus comprising:

a body, the body being mountable to the carrier boom;

a pair of gripper arms mounted to the body, the pair of gripper arms being selectively movable between an open configuration in which the tree is insertable therebetween and a closed configuration in which the pair of gripper arms is able to grip the tree therebetween; and a support arm operatively coupled to the body for supporting the cutting device, the support arm including a cutting device mount for mounting the cutting device thereto, the support arm being configured, sized and operatively coupled to the body in a manner such that the cutting device is rotatable relatively to the pair of gripper arms about three different rotation axes;

whereby, when the pair of gripper arms grips the tree, the pair of gripper arms stabilizes the support arm relatively to the tree and allows for the orientation of the cutting device relatively to the tree by the support arm. It is a general object of the present invention to provide a new and improved hydraulic tree pruning and trimming head attachment, hereinafter abbreviated simply as head attachment.

In another broad aspect, the invention provides an apparatus for gripping a tree, the apparatus comprising:

a carrier boom;

a body mounted to the carrier boom;

a pair of gripper arms mounted to the body, the pair of gripper arms being selectively movable between an open configuration in which the tree is insertable therebetween and a closed configuration in which the pair of gripper arms is able to grip the tree therebetween;

a support arm mounted to the body, the support arm including a cutting device mount;

a cutting device for selectively cutting a portion of the tree, the cutting device being mounted to the cutting device mount;

the support arm being configured, sized and operatively coupled to the body in a manner such that the cutting device is rotatable relative to the pair of gripper arms about three different rotation axes;

whereby, when the pair of gripper arms grips the tree, the pair of gripper arms stabilizes the support arm relatively to the tree and allows for the orientation of the cutting device relatively to the tree by the support arm.

In some embodiments of the invention, the head attachment generally comprises a lightly arched boom member having one end adapted for attachment to, for example, the distal end of the carrier boom that is revolvably mounted on a carrier vehicle. The opposite end of the arched boom member is overhanging, and coupled to, the upper end of a live double hinge joint. The live double hinge joint generally comprises two pivot joints having horizontal axes disposed normal to each other and equipped with individual hydraulic disk brake mechanisms for remotely locking their respective free pendulum movement.

The lower end of the live double hinge joint is fixedly coupled to the main body of a bidirectional hydraulic rotator allowing roughly a 355 degrees freedom of rotation to its output shaft, which is directed downwardly and rigidly connected to the upper end of an inverted L-shaped cradle bar. IN other embodiments, the bidirectional rotator allows roughly a 360 degrees freedom of rotation to its output shaft. The lower end of the cradle bar is pivotally connected through a horizontal pivot rigidly fixed to an upper portion of a gripper arms housing. The gripper arms housing is generally defined by an open bottom housing shell encompassing a pair of arched gripper arms and associated double acting hydraulic cylinders, all of which are pivotally mounted on horizontal pivots anchored between two side walls of the housing. The gripping portion of the arched gripper arms are protruding downwardly from under the open bottom of the gripper arms housing, ready to grasp and hold an underlying horizontal branch or trunk of a tree having its longitudinal axis disposed normal to the horizontal pivot axis of the housing with the cradle bar.

Pivotally mounted on a vertical pivot rigidly fixed to the side wall of the gripper arms housing, adjacent the horizontal pivot with the L-shaped cradle bar, is a laterally extensible support arm having a chain saw assembly pivotally connected at the outer end thereof. Through selective activations of double acting hydraulic cylinders, the extensible support arm can be swung along a horizontal path, as well as extended at a precise location along the longitudinal axis of a branch or trunk firmly held within the gripper arms, while the chain saw assembly at the outer end of the extensible support arm can execute a transversal, right angled cut, or at various diagonal angles, as desired by the operator.

The gripper arms housing, along with dependent extensible support arm and chain saw assembly, can be pivoted as a unit about 100 degrees upwardly, relative to the inverted L-shaped cradle bar, through the activation of a double acting hydraulic cylinder pivotally connected between the lower end of the cradle bar and the gripper arms housing.

Hence, when the gripper arms housing is pivoted 90 degrees upwardly (e.g. near its maximum of 100 degrees), relative to the L-shaped cradle bar, the arms are readily in position to grab and hold the longitudinal axis of a vertically standing trunk or branch of a tree. Moreover, the dependent extensible support arm and chain saw assembly land up underlying the gripper arms housing, ready to transversely cut the base of the branch or trunk of the tree while the gripper arms are firmly holding the latter above the chain saw assembly.

In some embodiments of the invention, the head attachment is equipped with a closed-circuit video camera with auxiliary lighting that are fixed to, for example, the gripper arms housing and are generally aiming at the work area covered by the extensible support arm and chain saw assembly.

Furthermore, the overall dimensions of the head attachment are typically compact for ease of maneuverability among complex structures of branches atop a standing tree. For example, appreciable performances could be attained with a head attachment having gripper arms capable of fully encircling a trunk or branch having up to about 16 inches (40 cm) in diameter, and an extensible support arm, with dependent chain saw mechanism, having a range of about 19 inches (48 cm) along the longitudinal axis of a branch or trunk held between the gripper arms. However, head attachments having gripper arms capable of encircling trunks or branches having other dimensions and having support arms having another range of motion are within the scope of the claimed invention.

The present invention has many advantages, including:

allowing an operator, safely positioned at a control panel at the base of a carrier boom or the like, to remotely grasp a branch or trunk of a tree, cut the latter at an appropriate position and angle relative to the gripper arms, and lay down the cut away portion at a desired location near by;

having extensible support arm and depending chain saw assembly that can be stably and efficiently operated solely for cutting operations by appropriately activating the disk brake mechanisms on the live double hinge joint and, thus, without having to use the gripper arms for holding the tree branch or trunk to be cut;

having gripper arms that can be easily positioned around a slightly unaligned trunk or branch due to the gravitational pendulum effect of the live double hinge joint which allows the gripper arms housing to naturally align itself along the longitudinal axis of the trunk or branch. This aspect provides appreciable maneuver margin to the operator remotely stationed at the control panel on the carrier vehicle. Additional maneuverability for aligning the gripper arms on a trunk or branch can be achieved by using the disk brake mechanisms of the live double hinge joint;

having overall degree of maneuverability further enhanced by the fact that every operable hydraulic components individually preserves its full range of operation at all times, regardless of the physical position of the other components of the head attachment. In other words, the full movements of one operable component is not constrained by the movements of another component of the head attachment;

being relatively small and easy to maneuver among tight arrangements of branches in a tree;

having an overall mechanical design allowing easy inspection and maintenance of its individual components;

being assembled using standard components, which makes it relatively economical to produce.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the drawings, closely related parts have the same reference number but different alphabetic suffixes. In the drawings.

FIG. 27: is a perspective view of an alternative head in accordance with another embodiment of the invention.

DETAILED DESCRIPTION

Figure 1:
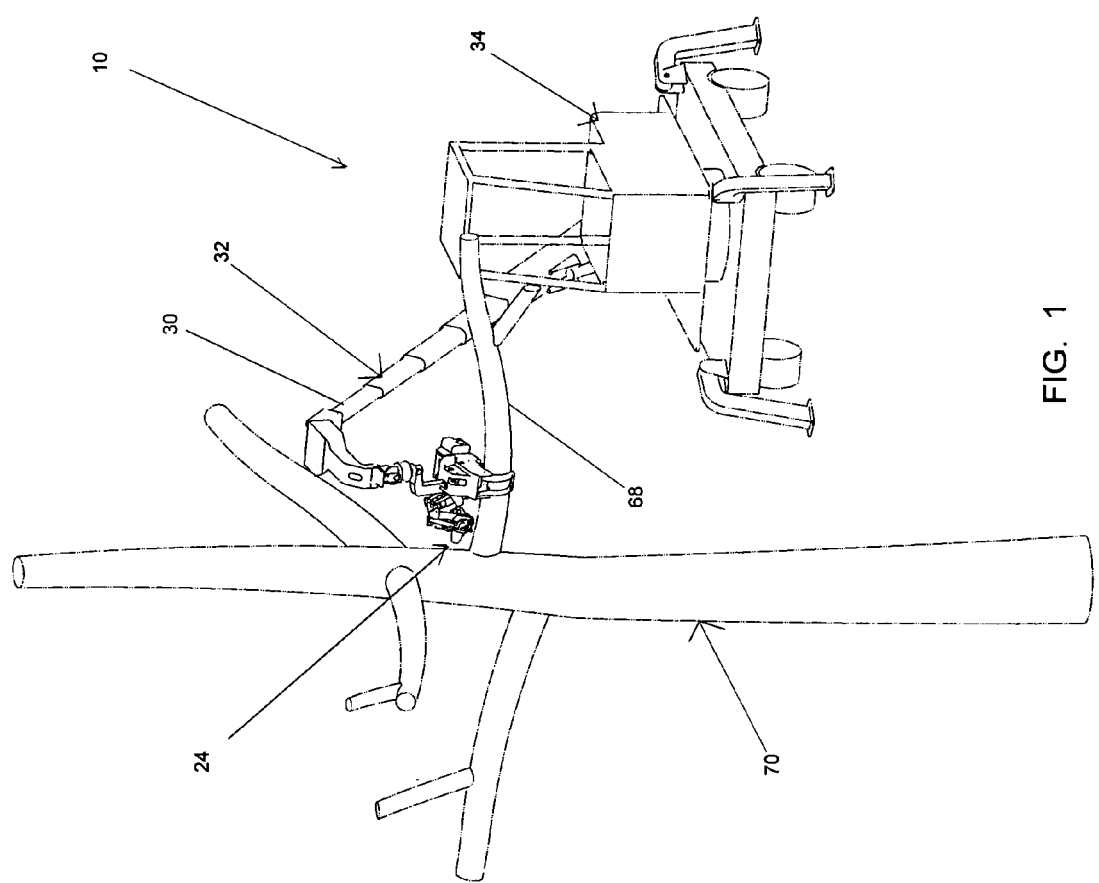
FIG. 1: is an environmental, front perspective view of an embodiment of a head according to the present invention, shown mounted at the distal end of a telescopic carrier boom on a self-powered vehicle. Note the chain saw assembly being on the same side of the telescopic boom as the control cabin of the operator located on the vehicle.
Figure 2:
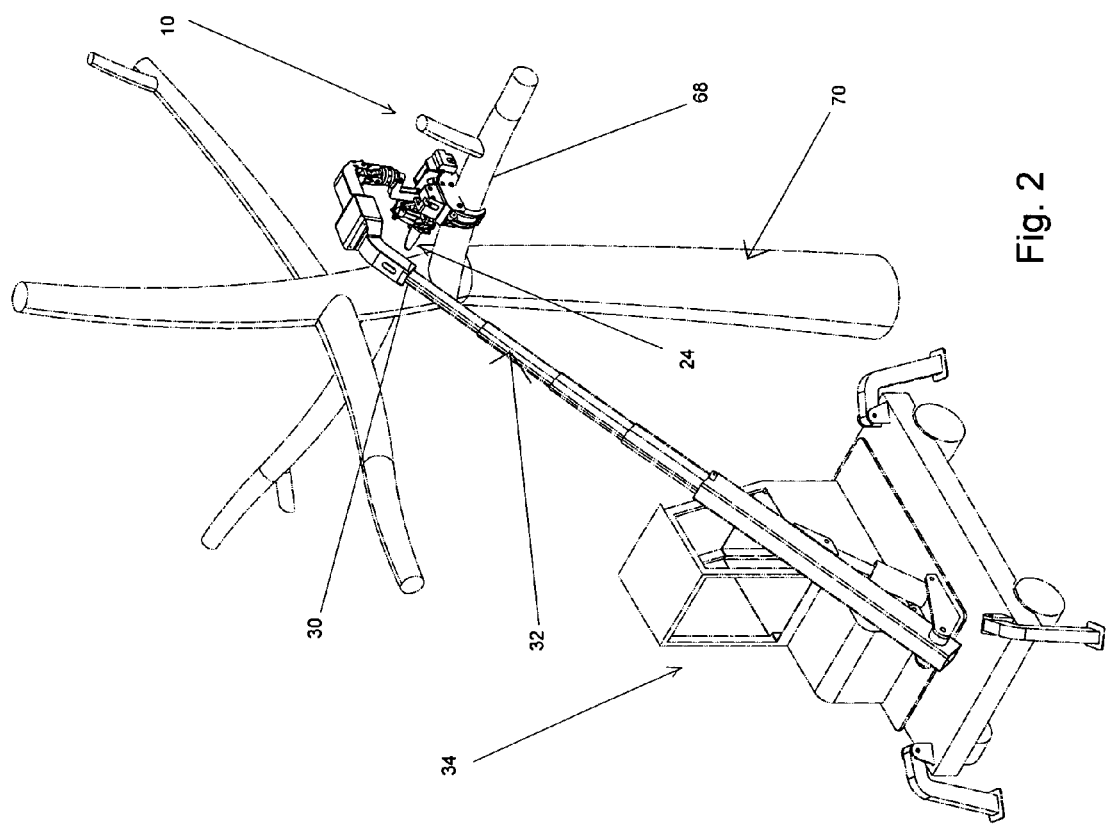
FIG. 2: is an environmental, rear perspective view of the head of FIG. 1, again shown mounted at the distal end of the telescopic carrier boom on the self-powered vehicle. Note the gripper arms housing and chain saw assembly that have been horizontally pivoted around relative to the articulated boom and vehicle.
Figure 3:
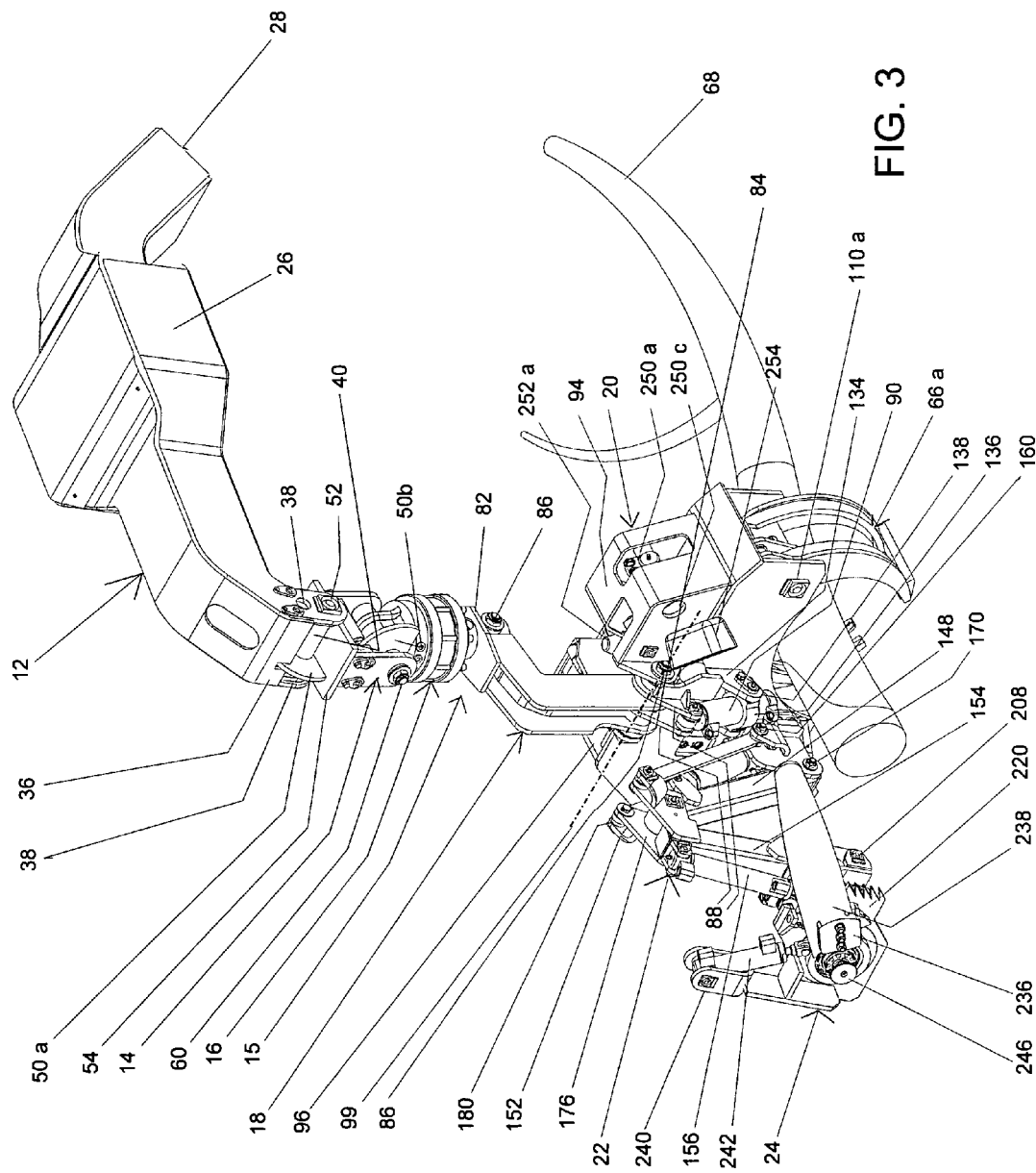
FIG. 3: is a front perspective view of the head of FIG. 1, shown with a severed tree branch, in phantom lines, clamped in the pair of gripper arms.
Figure 4:
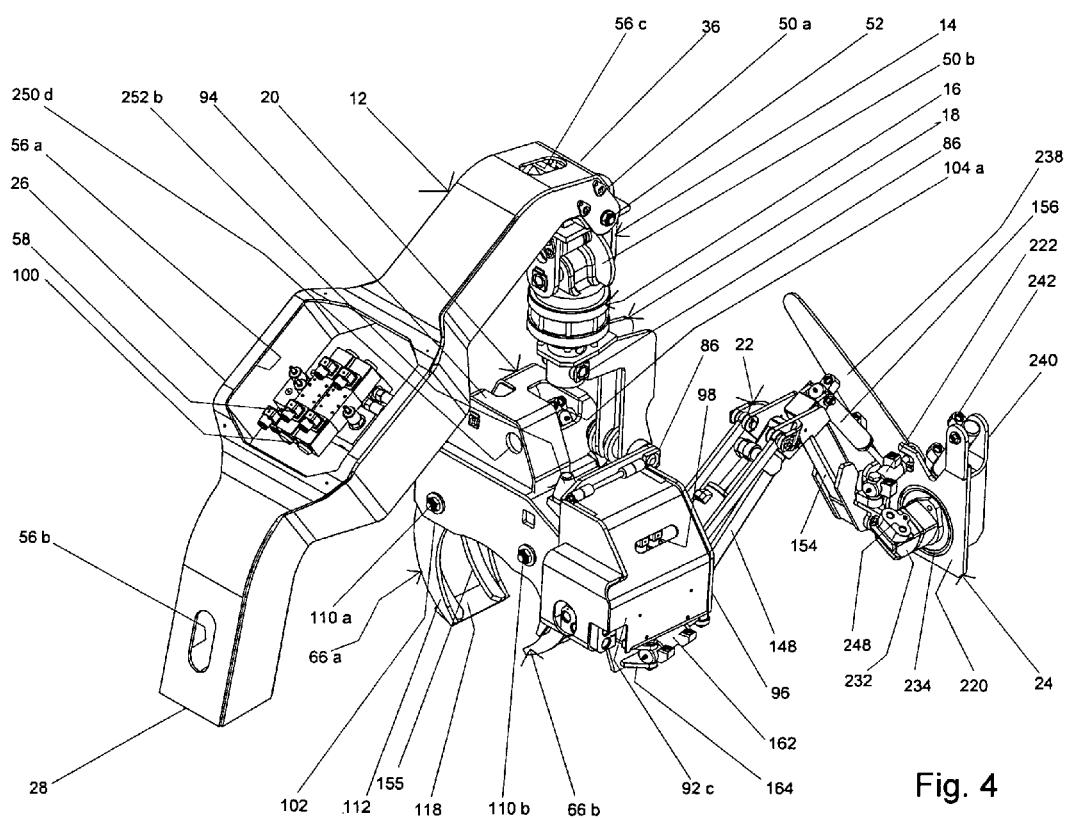
FIG. 4: is a rear perspective view of the head of FIG. 1, with covers of both first and second hydraulic control valves housings removed.

FIGS. 1 to 4 show various aspects of an embodiment of a hydraulic tree pruning and trimming head 10 according to the present invention, hereinafter abbreviated simply as a head 10. The head 10 constitutes an apparatus for gripping and cutting a tree. While the terminology tree is used throughout this specification, the reader skilled in the art will readily understand that tree includes parts of trees, such as for example branches. Therefore, the proposed apparatus is usable to cut any suitable portion of a tree, and not only whole trees. As best illustrated in FIGS. 3 and 4, the head 10 is preferably made of rigid materials such as steel and/or aluminum, and generally comprises the following main components: a substantially arched boom adaptor 12, a live double hinge joint 14, a bidirectional hydraulic rotator 16, an inverted L-shaped cradle bar 18, a gripper arms housing 20, an extensible support arm 22, and a chain saw assembly 24. The gripper arm housing 20 and inverted L-shaped cradle bar 18 are also referred to together as a body 15.

It is to be noted that all rigid and flexible hydraulic conduits and electrical wirings required for powering and controlling the hydraulic cylinders, rotators and associated control valves are of the conventional types and have been omitted from the present detailed description and appended drawings for clarity.

FIGS. 3 and 4 show the arched boom adaptor 12 generally defined by an elongated and lightly arched hollow structure having a substantially uniform rectangular cross section throughout its length except for an enlarged midsection serving as a control valve housing 26. Arched boom adaptor 12 has an open proximal end 28 adapted to receive the distal end 30 of an articulated carrier boom 32 mounted on, for example, a self-powered vehicle 34 (as shown in FIGS. 1 and 2), and a distal end 36 ending with a pair of laterally spaced bracket plates 38. The arched boom adaptor 12 therefore allows to mount the body 15 to the carrier boom 32. Bracket plates 38 are joined by a tubular sleeve 40, better seen in FIG. 3, to which is suspended a live double hinge joint 14 (described in more details hereinafter). Although proximal end 28 of arched boom adaptor 12 is defined as having a substantially rectangular cross section, it is to be understood that it can have any suitable shape and anchoring means compatible with the distal end 30 of a carrier boom 32.

As seen in FIG. 4, the control valve housing 26 offers a covered access hole 56a for the maintenance of a first set of hydraulic control valves 58 installed therein. Additional access holes 56b and 56c can be used for the passage of multiple hydraulic conduits and electrical wirings interconnected to and from an hydraulic pump and control panel (not shown), preferably installed at the base of the carrier boom 32, the first set of control valves 58, and other powered elements of the head 10 (described in more details hereinafter).

Figure 24:
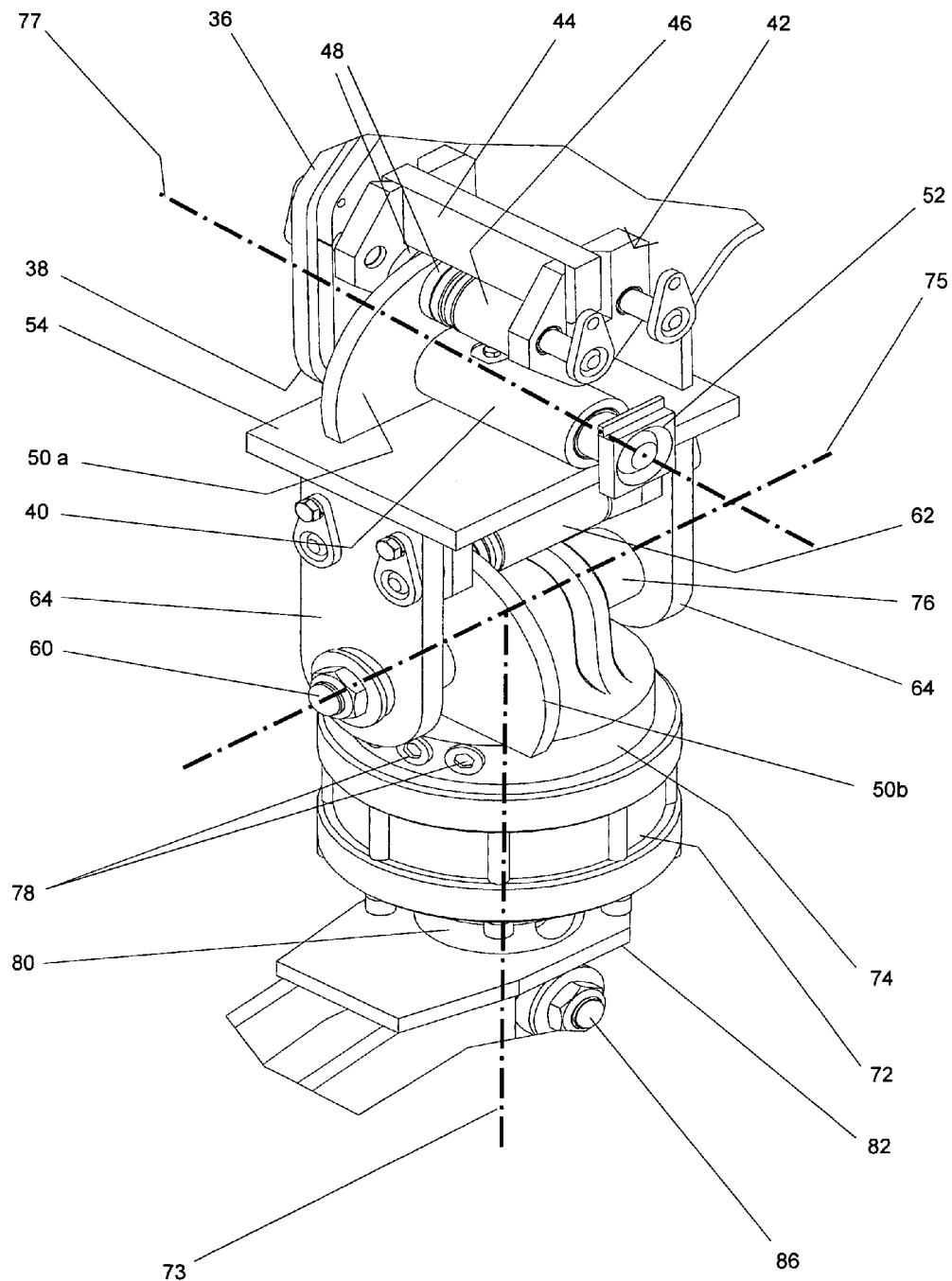
FIG. 24: is an enlarged fragmentary, perspective view of the live double hinge joint and rotator assembly shown in FIG. 23.

Furthermore, as best shown in FIG. 24, distal end 36 of arched boom adaptor 12 is equipped with a brake assembly for selectively applying a braking force onto the live double hinge joint 14 to resist pivotal movements of the live double hinge joint 14, The brake assembly includes a first disk brake caliper assembly 42. The first disk brake caliper assembly 42 generally comprises a caliper support structure 44, a brake cylinder 46 with brake pad elements 48 oppositely disposed on each side of a first half-circular brake disk 50a of underlying live double hinge joint assembly 14, described in more details below.

Pivotally mounted about pivot 52 on distal end 36 of arched boom adaptor 12, is a live double hinge joint assembly 14. Double hinge joint assembly 14 generally comprises a first half-circular brake disk 50a perpendicularly affixed to a substantially rectangular base plate member 54.

A tubular sleeve 40, in coaxial relation around pivot 52, is substantially in parallel with, and welded to, the upper plane of supporting rectangular base plate 54, as well as centered through the radial center of half circular brake disk 50a.

Immediately attached under rectangular base plate member 54 there is a second disk brake mechanism generally similar to the one above base plate 54, but having laterally spaced bracket plates 64, pivot 60, second half-circular brake disk 50b and brake caliper assembly 62 oriented perpendicularly to the latter in the horizontal plane.

As it will be more apparent from the following description, the live double hinge joint 14, thus equipped with disk brake mechanisms, allows the operator on the carrier vehicle to selectively apply firm or modulated braking on only one or both axis of the double hinge joint 14, or apply no braking at all. These various braking modes can be useful during specific operations of the head 10. For example, the head 10 is easier to maneuver if it is hanging by gravity, as a free pendulum, when the open gripper arms 66a and 66b need to be positioned against a branch 68 or trunk 70 of a tree, ready to grab the latter. In other situations, some braking may need to be applied on one or both axis of the double hinge joint 14 to render rigidity to the attachment head 10 as a whole. For example, when only the extensible support arm 22 and chain saw assembly 24 are used for freely cutting branches on a tree, without the use of the gripper arms 66a and 66b, or when the gripper arms 66a and 66b are manipulating an unbalanced load, such as a relatively heavy section of branch or trunk grabbed horizontally from one end.

The reader skilled in the art will readily appreciate that in alternative embodiments of the invention, the live double hinge joint 14 is replaced by an alternative live hinge joint that pivots about a single axis. Also, in yet other embodiments of the invention, the live hinge joint is not coupled to a brake assembly and no breaking force can be exerted thereonto. Also, in some embodiments of the invention, the double live hinge joint 14 allows pivotal movement about two substantially perpendicular hinge axes.

When present, the live double hinge joint 14 is attachable to the carrier boom 32 through the arched boom adaptor 12 and operatively coupled to the body 15 for allowing the body 15 to substantially freely pivot about the live hinge joint relative to the carrier boom 32.

Figure 18:
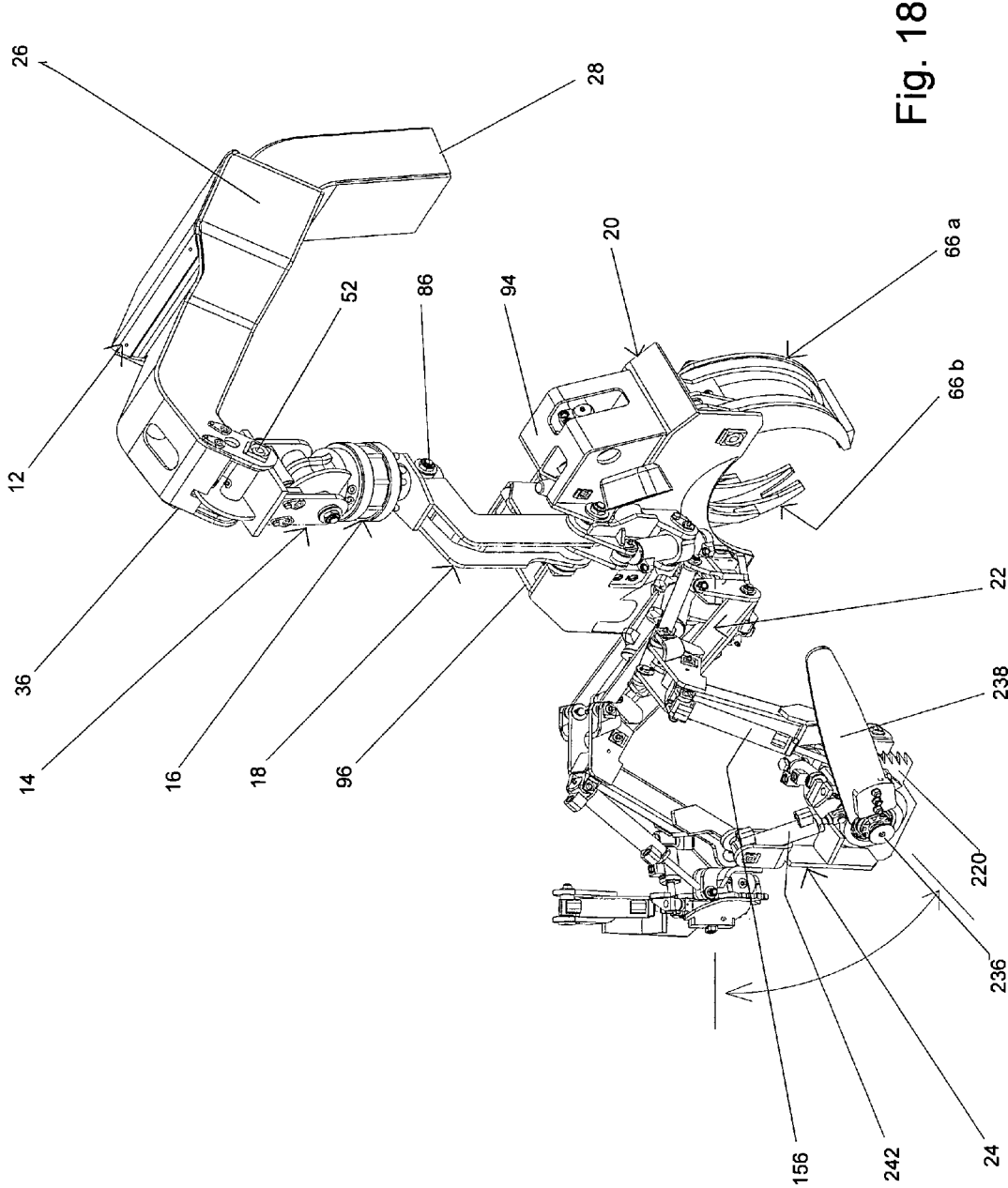
FIG. 18: is a front perspective view of the head of FIG. 1, again showing the lateral rotational range of the extensible support arm with dependent chain saw assembly.
Figure 19:
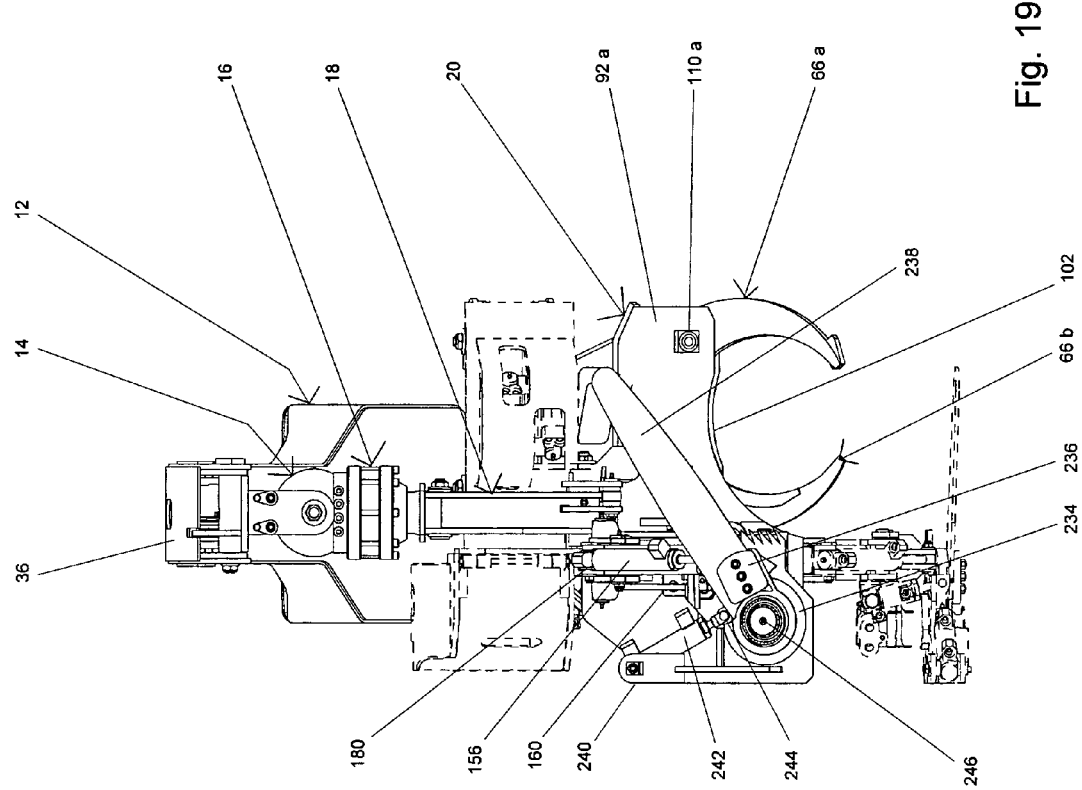
FIG. 19: is a front elevational view of the head of FIG. 1, showing the vertical tilt movement of the combined gripper arms housing, extensible support arm and chain saw assembly.
Figure 21:
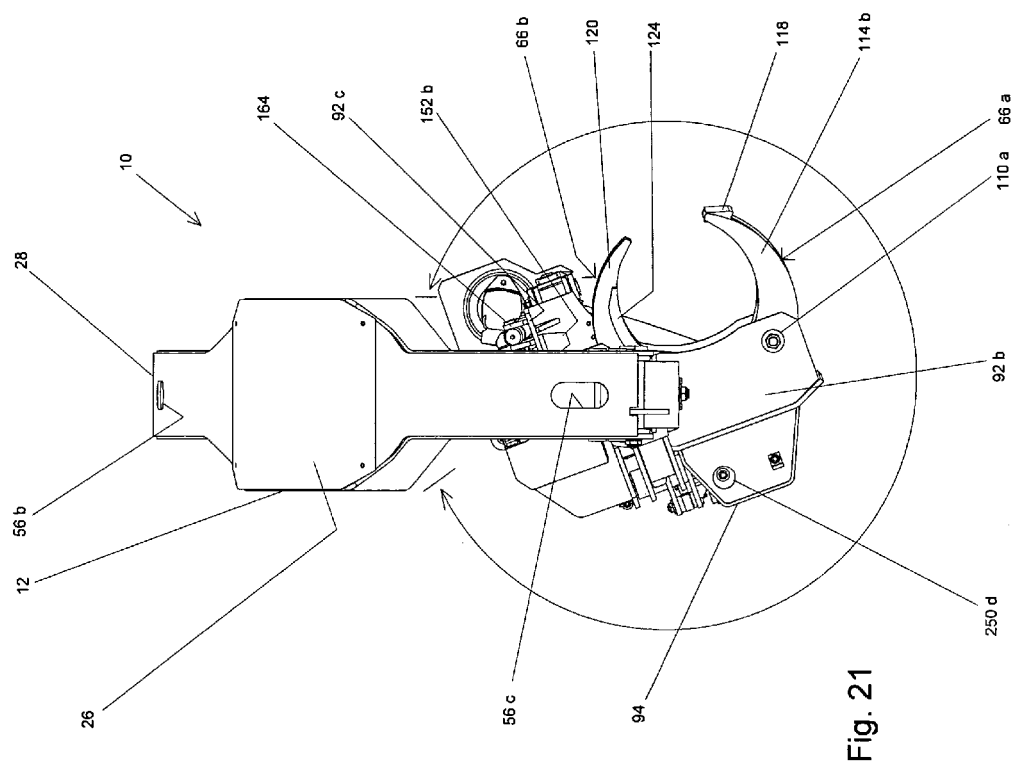
FIG. 21: is a top plan view of the head of FIG. 1, showing the lateral rotation of the gripper arms housing with dependent extensible support arm and chain saw assembly.

Still referring to FIG. 24, underlying the live double hinge joint 14 there is a bidirectional hydraulic rotator 16, although in alternative embodiments of the invention, non-hydraulic bidirectional rotators 16 are usable. The substantially cylindrical main body 72 of the bidirectional hydraulic rotator 16 is static relative to the vertical axis of the overlying double live hinge joint 14, which therefore causes the bidirectional hydraulic rotator 16 to be selectively rotatable about a rotator axis 73 that is substantially perpendicular to both of the axes about which the double live hinge joint 14 rotate, namely the live hinge axes 75 and 77 defined by the pivots 52 and 60. Furthermore, the upper portion 74 of the rotator 16 is acting as a substantially horizontal base plate to which is fixed half-circular brake disk 62 and tubular pivot sleeve 76 of the second disk brake mechanism. Upper portion 74 serves as well as a hook-up point for flexible hydraulic conduits through lateral hydraulic ports 78. Vertical rotator output shaft 80 is rigidly coupled to the proximal end 82 of the underlying L-shaped cradle bar 18 through locking bolt 86 and offers roughly 355-360 degrees of rotational freedom about its vertical axis relative to the overhanging rotator main body 72 (as best shown in FIGS. 18, 19 and 21).

Figure 20:
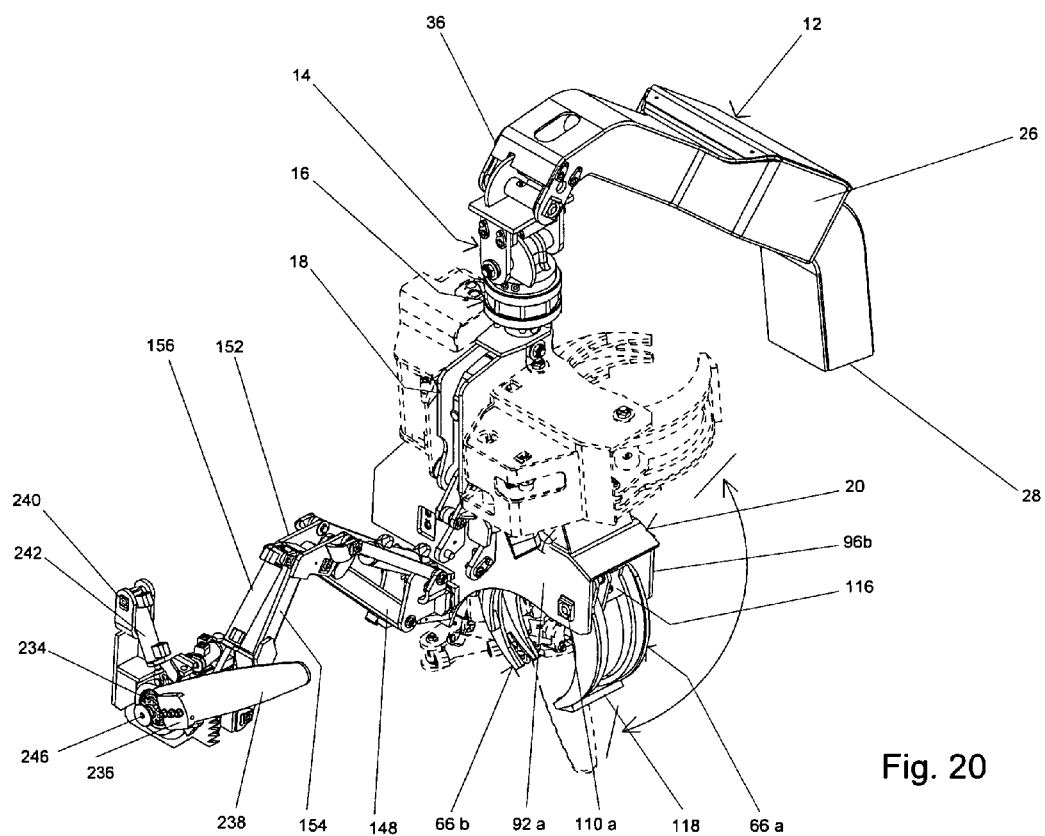
FIG. 20: is a front perspective view of the head of FIG. 1, again showing the full vertical tilt movement of the gripper arms housing with dependent extensible support arm and chain saw assembly.
Figure 23:
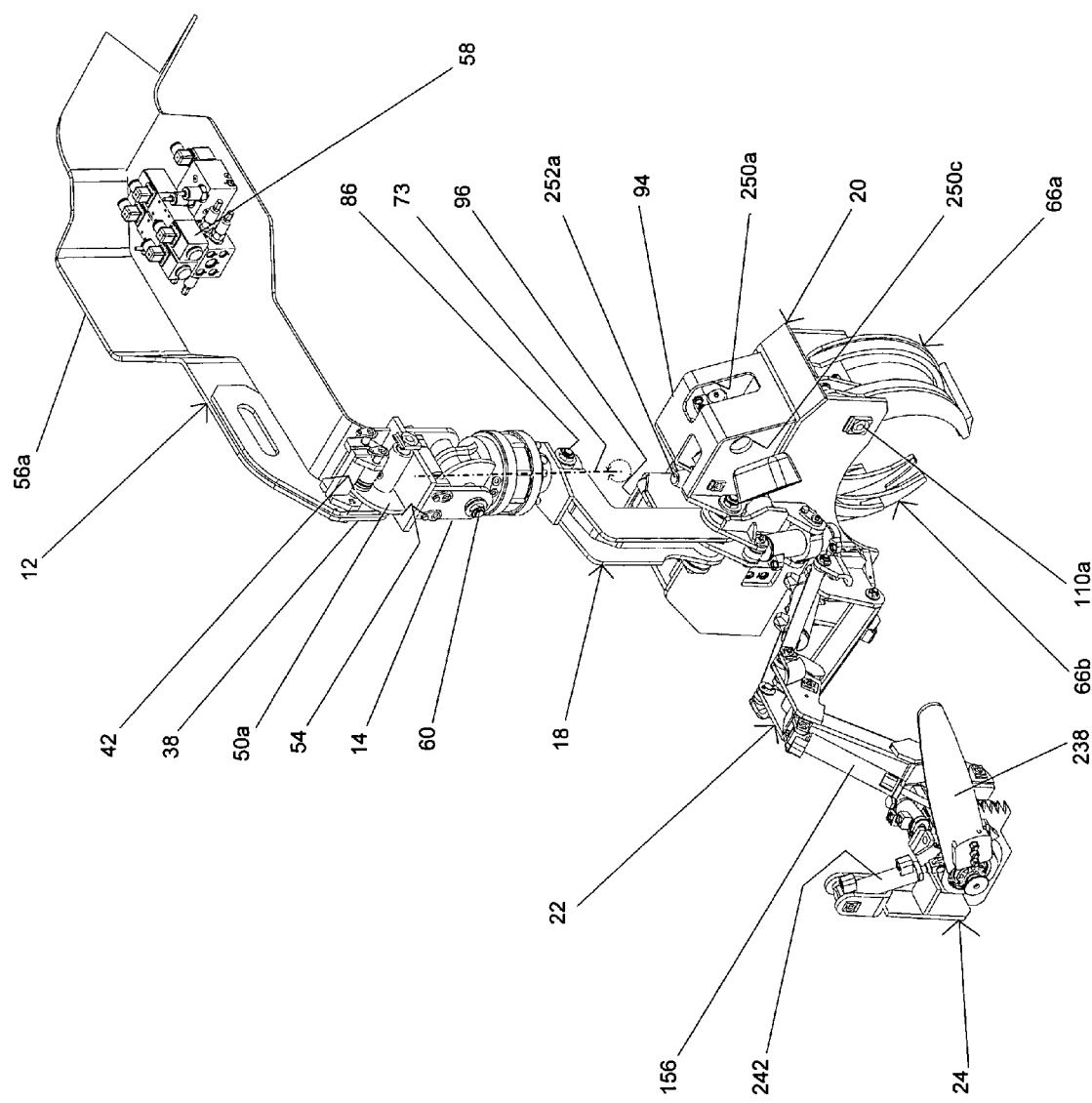
FIG. 23: is a front perspective view of the head of FIG. 1, showing a cross-sectional view of the arched adaptor arm, as well as the free pendulum movement of the double hinge joint.

Referring to FIG. 3, the L-shaped cradle bar 18 is generally defined as having a proximal end 82 and a distal end 84, as well as having a substantially inverted L-shaped profile with an H-beam cross-section throughout its profiled length. Near distal end 84, there is transversally mounted main horizontal pivot 86 to which is pivotally mounted gripper arms housing 20. At distal end 84 there is a pair of laterally spaced bracket plates 88 to which is pivotally mounted one end of the main hydraulic cylinder 90 associated with the vertical pivoting movement of the gripping arms housing 20, as best shown in FIGS. 19 and 20. Gripper arms housing 20 and main hydraulic cylinder 90 will be described in more details below. Therefore, the gripper arms 66a and 66b are operatively coupled to the bidirectional rotator 16 so as to be pivotable about a rotator-to-gripper arms axis 99 substantially perpendicular to the rotator axis 73 (shown in FIG. 23). The main hydraulic cylinder 90 is therefore an actuator for selectively pivoting the gripper arms housing 20 relative to the L-shaped cradle bar 18.

Figure 22:
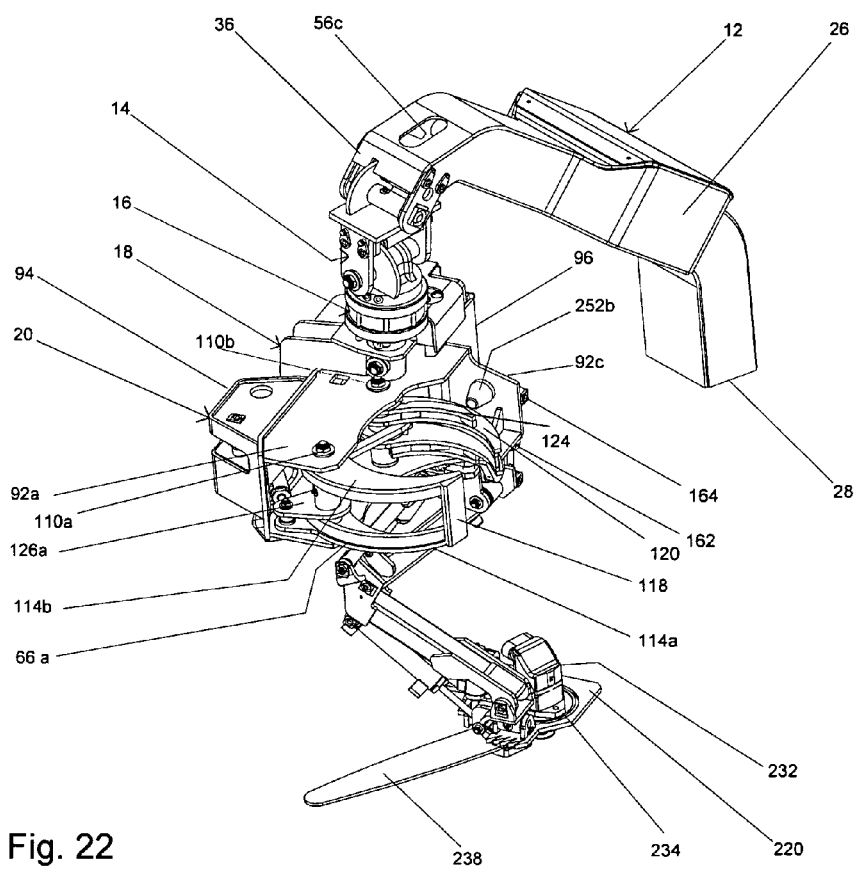
FIG. 22: is a front perspective view of the head of FIG. 1, showing a cross-sectional view of the gripper arm housing assembly, with dependent extensible support arm and chain saw assembly, fully tilted as a unit in a vertical position.

FIGS. 3 through 8 best illustrate gripper arms housing 20 as generally defined by oppositely disposed parallel side walls 92a and 92b (better seen in FIG. 9) that are joined at their upper edges by an hydraulic cylinder housing 94, and closed at one end by end wall 92c (as best shown in FIG. 22). The L-shaped cradle bar 18 acts as a spacing element for spacing said gripper arms housing 20 from said bidirectional hydraulic rotator 16. As better shown in FIG. 4, a control valve housing 96, containing a second set of control valves 98 and a hydraulic ports concentrator panel 100, is fastened to the upper portion of end wall 92c. Parallel side walls 92a and 92b have a substantially arciform lower edge 102 for stably engaging one side of a branch or trunk of a tree, while gripper arms 66a and 66b are applying pressure on the opposite side (as best shown in FIG. 3). Thus, side walls 92a and 92b, end wall 92c, as well as cylinders and control valves housings 94 and 96, cooperatively provide a structural chassis, as well as a protective hub encompassing gripper arms 66a and 66b, hydraulic cylinders 104a and 104b, and hydraulic control valves 98.

Figure 5:
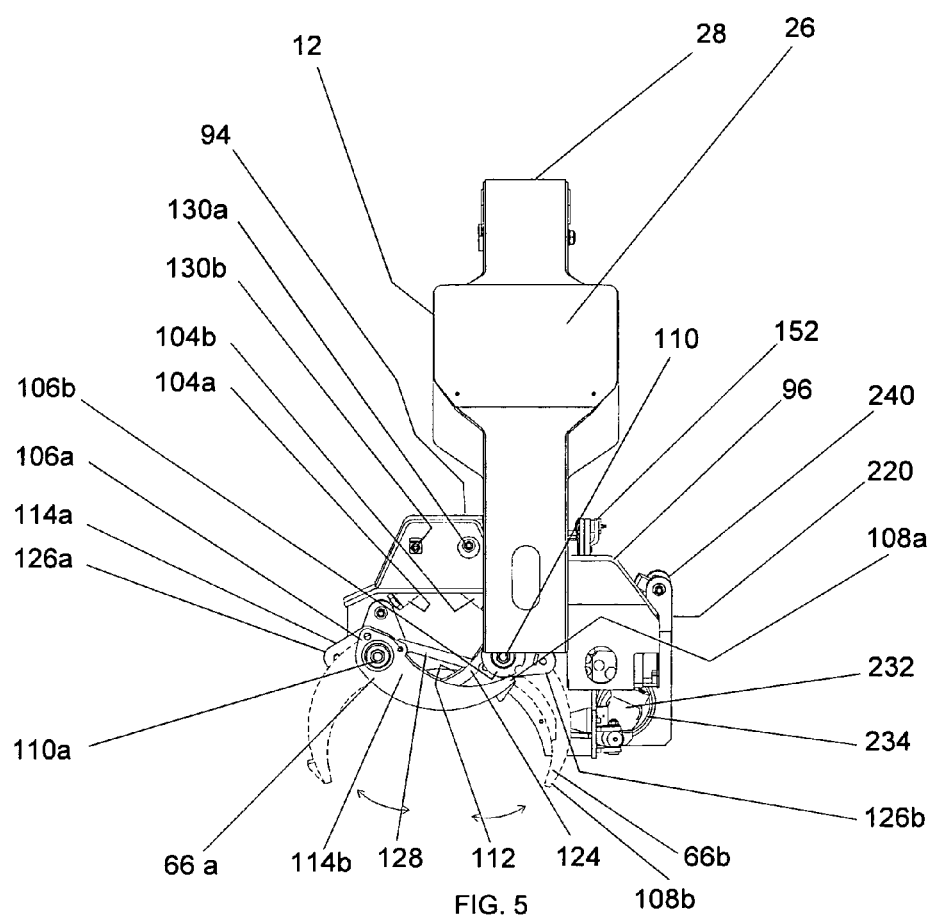
FIG. 5: is an elevational rear end view of the head of FIG. 1, showing the relative movement of the pair of gripper arms between an open and a closed configuration. A cross-sectional view of the gripper arms housing is shown for a better internal view of the gripper arms actuating mechanism.
Figure 6:
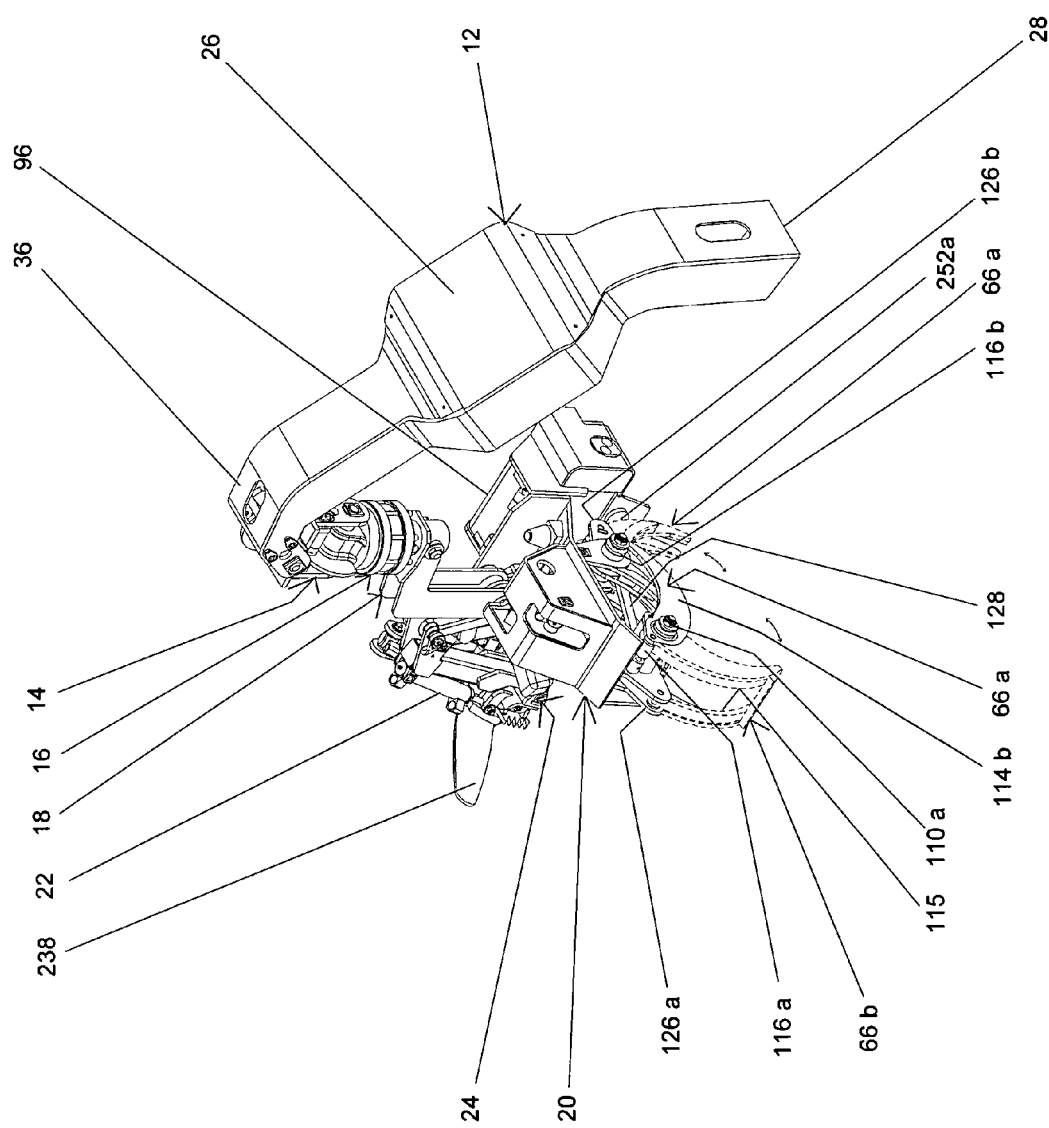
FIG. 6: is a rear end perspective view of the head of FIG. 1, again showing the relative movement of the pair of gripper arms between the open and closed configurations. A cross-sectional view of the gripper arms housing is shown for a better internal view of the gripper arms actuating mechanism.

As best shown in FIGS. 5 and 6, gripper arms 66a and 66b have proximal ends 106a and 106b, as well as distal ends 108a and 108b respectively. The gripper arms further have a substantially sharp, arched tooth shape with the inner side 112 representing the gripping portion for engaging a branch or trunk of a tree. As best shown in FIGS. 5 and 6, gripper arms 66a and 66b are pivotally mounted near their proximal ends 106a and 106b on pivots 110a and 110b positioned transversely between side walls 92a and 92b so that the gripper arms 66a and 66b are selectively movable between an open configuration in which a tree, or a portion of a tree, is insertable therebetween and a closed configuration in which the gripper arms 66a and 66b are able to grip the tree or portion of tree therebetween.

Figure 8:
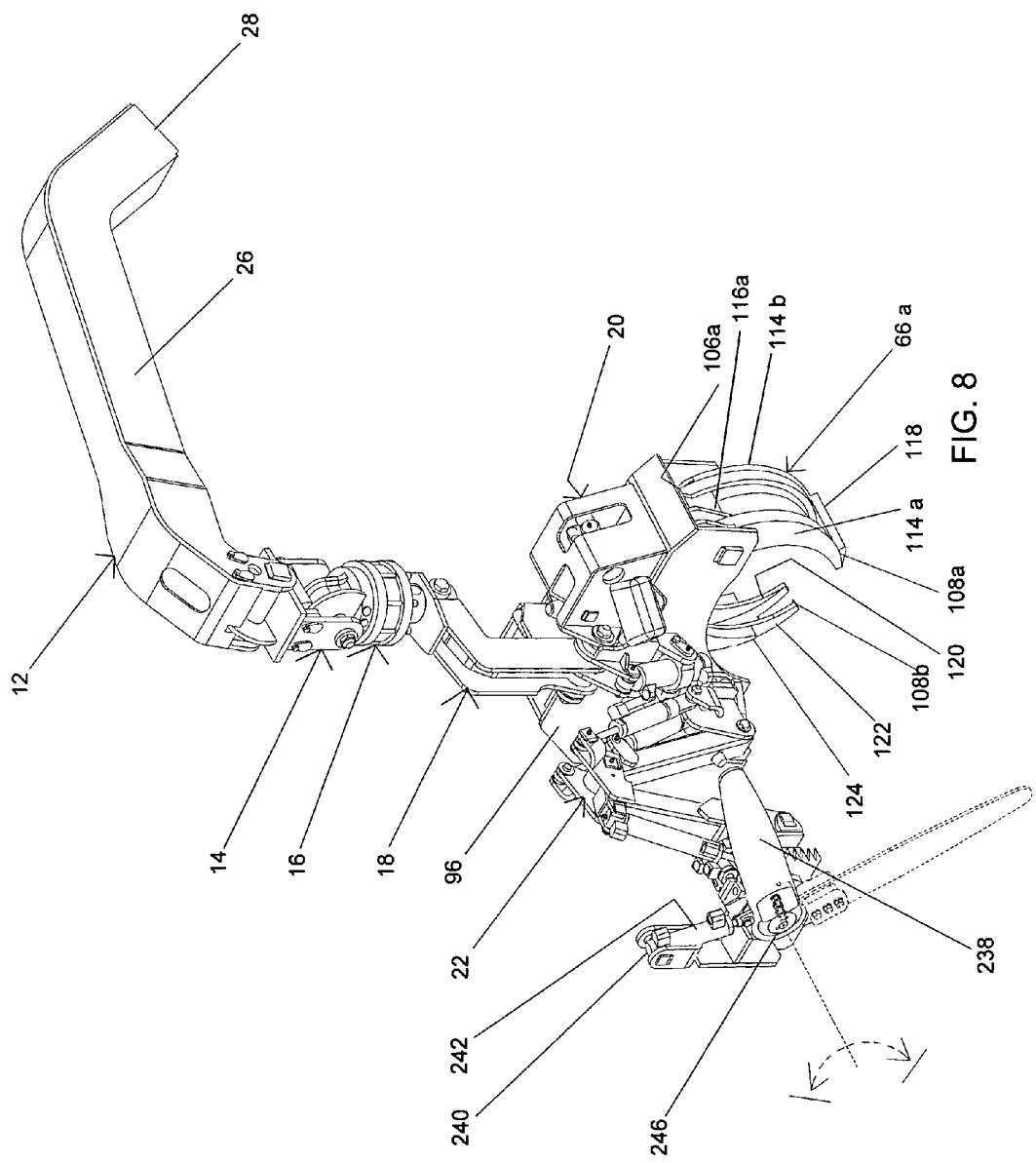
FIG. 8: is a front perspective view of the head of FIG. 1, again showing the rotational movement of the chain saw assembly relative to the extensible support arm, with the latter being shown in a half extended position.

As seen in FIG. 8, gripper arm 66a is generally defined by a pair of parallel arched members 114a and 114b having oppositely disposed L-shaped cross-sections that are joined, through their common pivot axis near proximal end 106a, by a tubular sleeve 116a in coaxial relation around pivot 110a, and, at distal end 108a, by a cross-plate 118. Of the two arched members, only member 114a has a pair of parallel flanges 126a (seen in FIG. 5) generally projecting opposite of distal end 108a for pivotally connecting one end of double acting hydraulic cylinder 104a.

Relatively narrower gripper arm 66b is generally defined by a main central arched member 120 having an inwardly U-shaped cross-section and ending with a pair of pointed teeth 122 at distal end 108b. Central arched member 120 has two relatively shorter lateral flanges 124 protruding on each side, with both the central arched member 120 and lateral flanges 124 pivotally connected to pivot pin 110b through a common tubular sleeve 116b in coaxial relation around the latter (as best shown in FIG. 22). Likewise gripper arm 66a, gripper arm 66b has a pair of parallel flanges 114b for pivotally connecting double acting hydraulic cylinder 104b, and are positioned diagonally opposite parallel flanges 126b of gripper arm 66a.

Furthermore, central arched member 120 of gripper arm 66b is generally dimensioned to freely pass through an aperture 115 extending through the gripper arm 66a and defined by the rectangular frame defined by the pair of side members 114a and 114b and cross plate 118 of the relatively wider gripper arm 66a, while the lateral flanges 124 are freely framed within the oppositely disposed L-shaped cross-section of arched members 114a and 114b, when gripper arms 66a and 66b are synchronously closed inwardly.

To positively assure the closing synchronism of gripper arms 66a and 66b relative to each other, a synchronizing element in the form of a substantially S-shaped interlocking bar 128 is pivotally connected to opposite upper and lower sides of tubular sleeves 116a and 116b respectively. Thus, interlocking bar 128 allow the arms to fully close around a branch or trunk in a flawless synchronism, even if one of the two actuator cylinders 104a or 104b shows signs of lagging. In alternative embodiments of the invention, the gripper arms 66a and 66b are synchronized to each other using any other synchronizing element, such as a pinion gear or a timing chain, among other possibilities.

Furthermore, as best shown in FIG. 5, when gripper arms 66a and 66b are in a fully closed configuration, the central aperture, defined by the circumscribing arms and the lower profiled edges 102 of the side walls 92a and 92b, has a diameter of roughly 1 inches (2.54 cm). When distal ends 108a and 108b of both gripper arms are at their closest position relative to one another, the central aperture created therein has a diameter of about 16 inches (41 cm). And, finally, when the gripper arms are in a fully open configuration, their respective distal ends offer a maximum aperture of roughly 35 inches (89 cm).

As best shown in FIGS. 5 and 6, torque drive elements for the activation of gripper arms 66a and 66b, represented by hydraulic cylinders 104a and 104b, have their upper end 132a and 132b (seen in FIG. 9) pivotally connected, diagonally opposite to one another, to pivots means 130a and 130b within the upper end of towering cylinder housing 94. The opposite ends of hydraulic cylinders 104a and 104b are pivotally connected to parallel flanges 126a and 126b on the upper end of gripper arms 66a and 66b respectively.

Referring to FIG. 3, at roughly the central position of the combined planar surface created by side wall 92a and adjacent control valve housing 96 are fixed laterally spaced support flanges 134 for pivotally holding collar 136 through lateral pivots 138. Collar 136 is fixed around the cylinder portion of main hydraulic cylinder 90 whose upper end 140, as described above, is pivotally connected to laterally spaced bracket plates 88 welded to L-shaped cradle bar 18. When main hydraulic cylinder 90 is extended and retracted, gripper arms housing 20 is revolved roughly 100 degrees in a vertical plane around main horizontal pivot 86. Main horizontal pivot 86 is rigidly fixed substantially above side wall 92a, between hydraulic cylinder housing 94 and the upper portion of end wall 92c. FIGS. 19, 20 and 22 best illustrate the vertical 100 degrees pivot movement of gripper arms housing 20, including dependent extensible support arm 22 and chain saw assembly 24, around main horizontal pivot 86.

It is to be noted that when gripper arms housing 20 with dependent extensible support arm 22 and chain saw assembly 24 are fully pivoted upwardly as a unit about main horizontal pivot 86, the housing 20 ends up substantially stationed under the partial overhanging frame created by the inverted L-shaped cradle bar 18, with the extensible support arm 22 and chain assembly 24 vertically aligned under the housing. Hence, the overall balance of the attachment head 10 is essentially preserved, regardless of the relative angle between the L-shaped cradle bar 18 and gripper arms housing 20.

It is important to note that all horizontal and vertical references that will be mentioned hereinafter are relative to gripper arms housing 20, with dependent extensible support arm 22 and chain assembly 24, being in a lowered down position, such as shown in FIG. 3.

Figure 14:
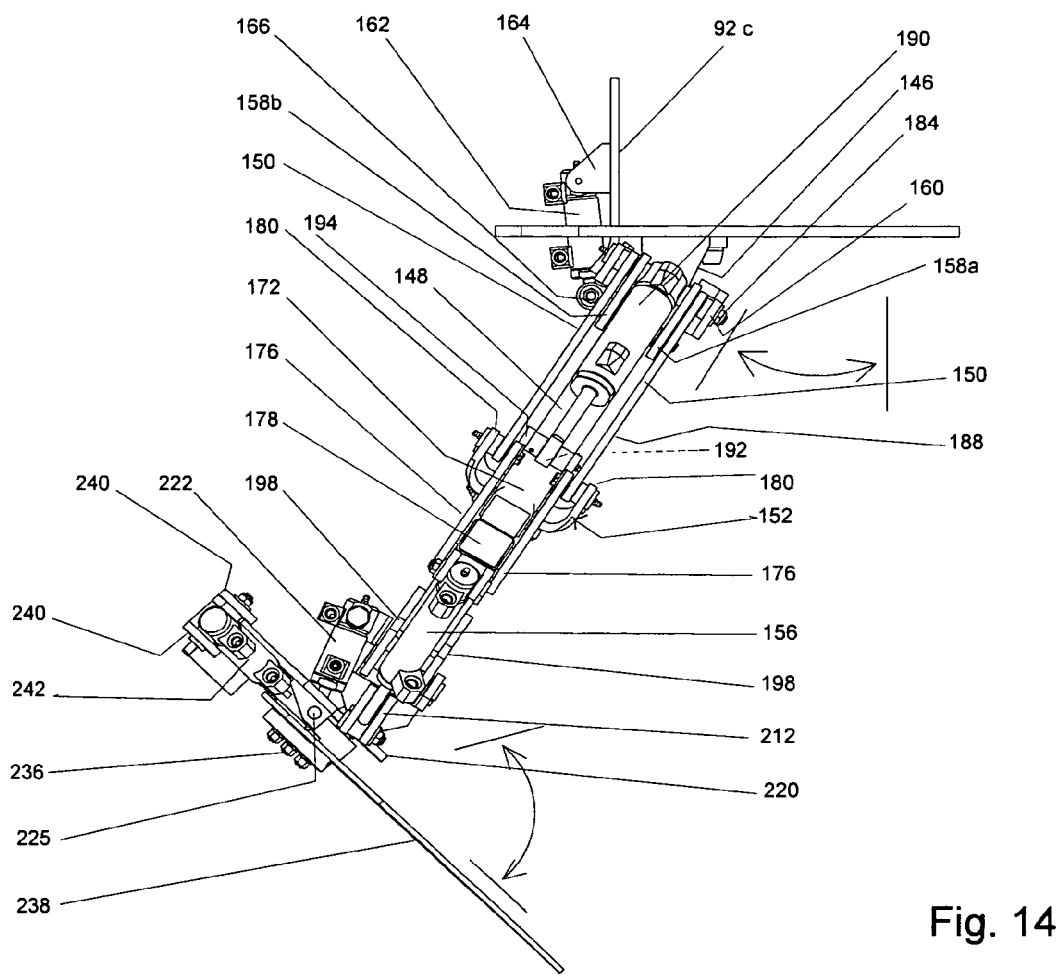
FIG. 14: is a fragmented top plan view of the head of FIG. 1, showing the rotational range of the extensible support arm relative to the gripper arms housing, as well as the rotational range of the chain saw assembly relative to the extensible support arm.
Figure 15:
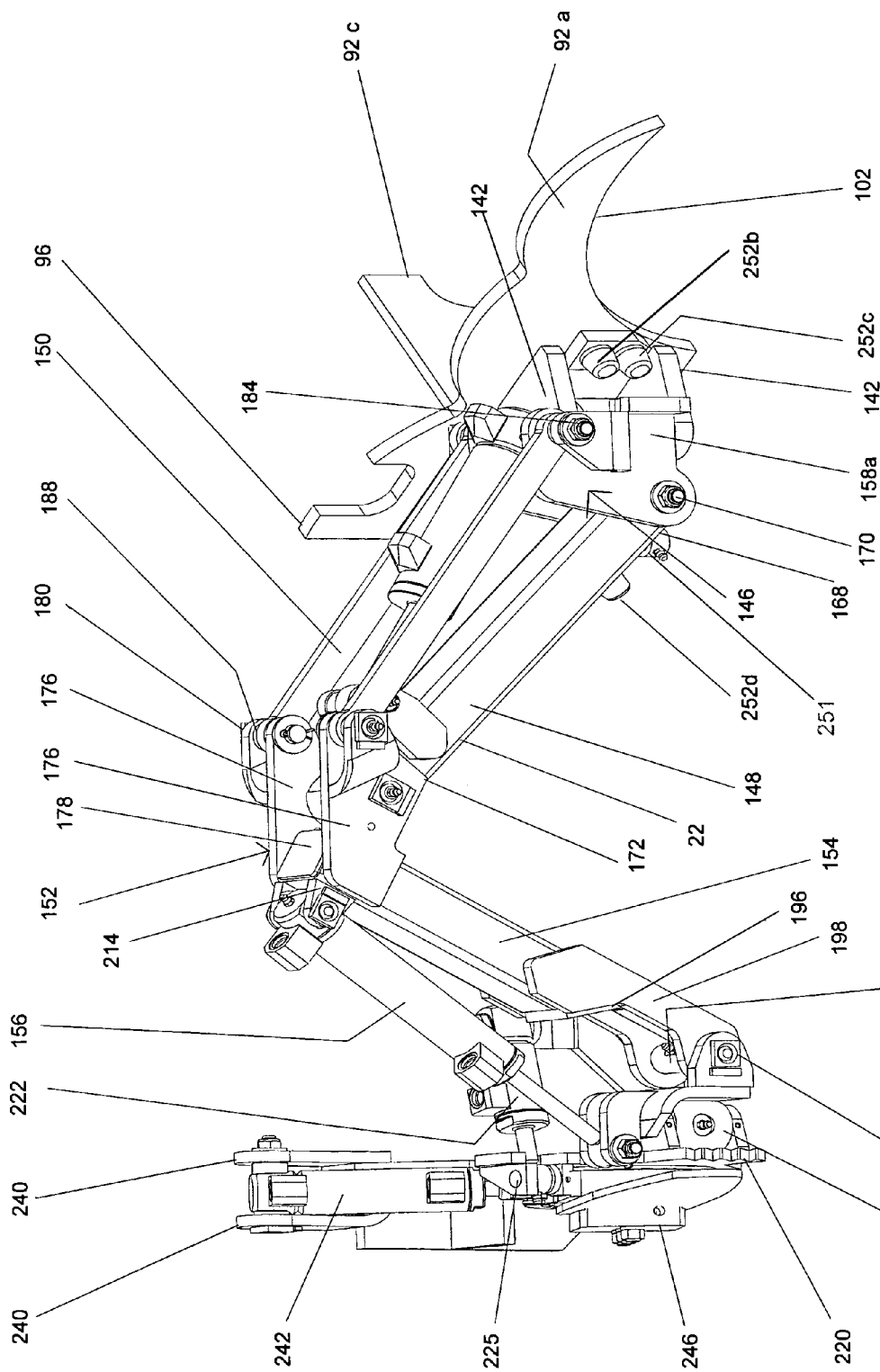
FIG. 15: is a fragmented front perspective view of the head of FIG. 1, showing the rotational range of the extensible support arm relative to the gripper arms housing, as well as the rotational and canting range of the chain saw assembly, relative to the extensible support arm.

As best shown in FIGS. 14, 15 and 22, positioned on the lower end portion of side wall 92a of gripper arms housing 20, and generally disposed between main horizontal pivot 86 and control valve housing 96, there are vertically spaced apart horizontal support flanges 142 for holding a vertical pivot 144 to which is pivotally connected extensible support arm 22. The extensible support arm 22 is therefore operatively coupled to the gripper arm housing 22 so as to be jointly pivotable therewith relative to the cradle bar 18.

Extensible support arm 22 is a scissors type boom generally comprising a pivotable base member 146, a first elongate member 148 with auxiliary leveling members 150, a knee assembly 152 and a second elongate member 154. A cutting device for selectively cutting a portion of a tree is mounted to the extensible support arm 22. The cutting device takes the form of a chain saw assembly 24, including hydraulic cylinder 156, and is pivotally connected to the outer end of second elongate member 154, and will be described in more details hereinafter. While the cutting device shown in the drawings takes the drawings is a chain saw assembly 24, other cutting devices, such as for example and non-limitingly a circular saw or a hydraulic saw are usable in alternative embodiments of the invention.

Pivotable base member 146 generally comprises a pair of oppositely disposed vertical flanges 158a and 158b, each having lateral support means 160, and joined at one end by a pivot holding means (not shown) in coaxial relation around vertical pivot 144. As best shown in FIGS. 14 and 22, vertical flange 158b is further pivotally connected on its outer side to a first end 166 of a double acting hydraulic cylinder 162 whose opposite end, in turn, is pivotally connected to a pivot holding means 164 rigidly fixed to the outer side of end wall 92c. When extended and retracted, hydraulic cylinder 162 causes pivotable base member 146 and, hence, extensible support arm 22 with dependent chain saw assembly 24, to revolve, for example, roughly 40 degrees in an horizontal plane around the vertical axis represented by pivot 144 (as best shown in FIGS. 14, 15, 17 and 18).

First elongate member 148, having a substantially square cross-section, has its proximal end 168 pivotally connected about a horizontal pivot 170 rigidly fixed between the lower distal portion of vertical flanges 158a and 158b, relative to vertical pivot 144. In turn, distal end 172 of first elongate member 148 is pivotally connected about an horizontal pivot 174 rigidly fixed between a pair of generally triangular flanges 176 welded to the proximal end 178 of second elongate member 154, at a substantially right angle relative to the longitudinal axis of the latter.

Figure 12:
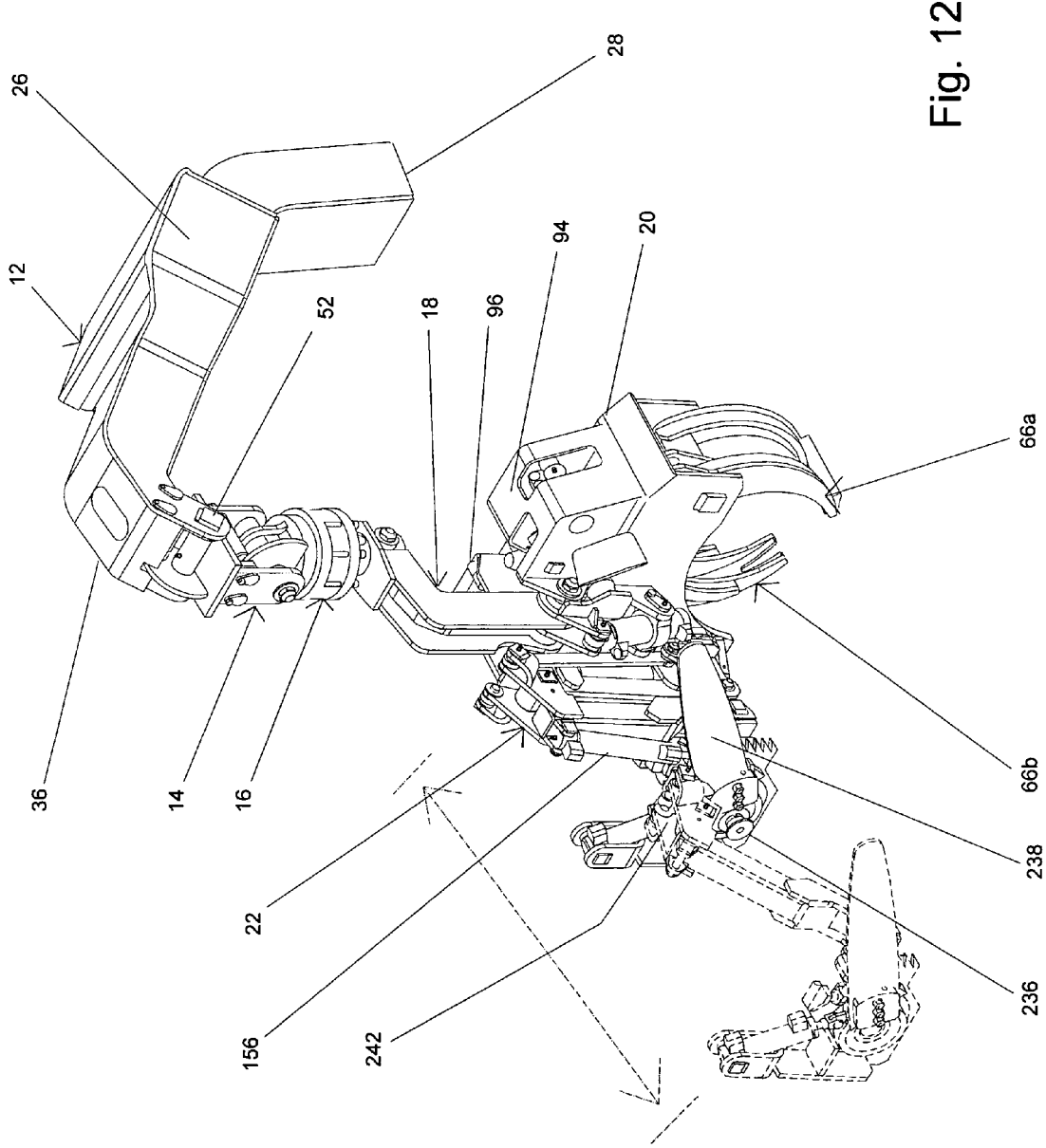
FIG. 12: is a front perspective view of the head of FIG. 1, showing the range of the extensible support arm between a retracted and an extended configuration.
Figure 13:
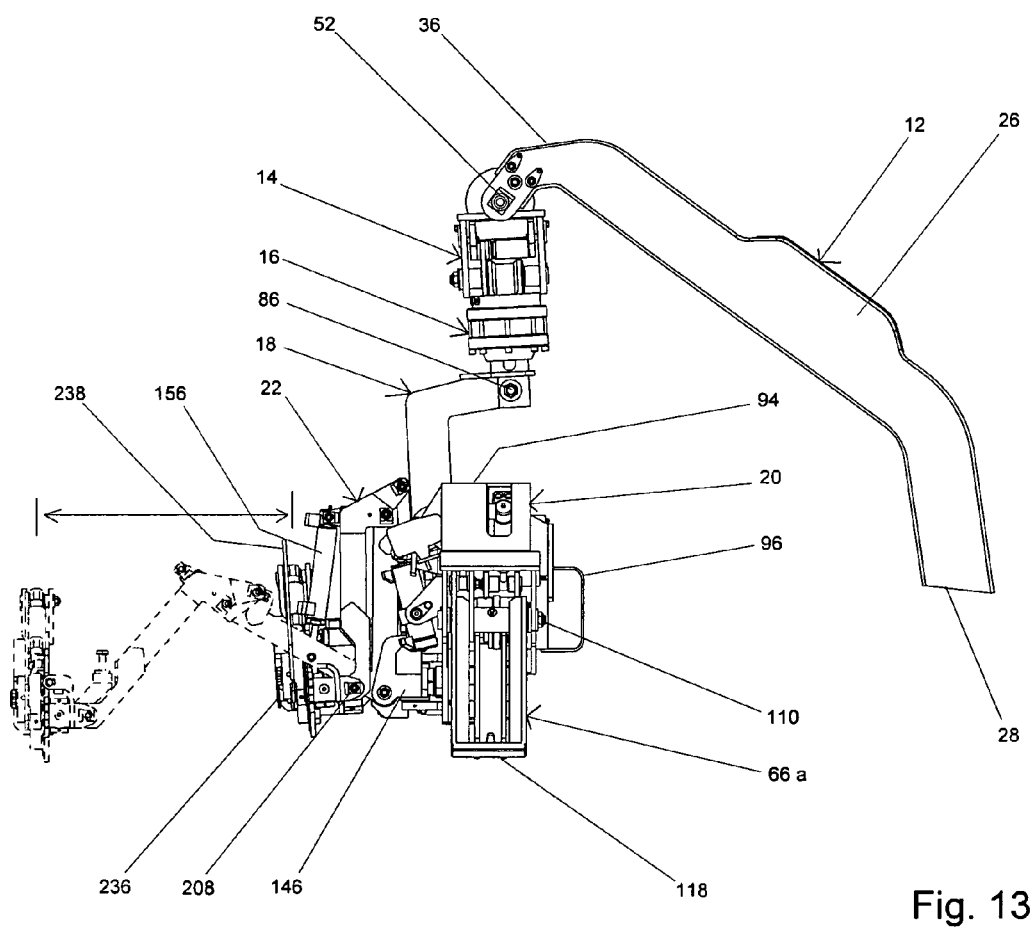
FIG. 13: is a side elevational view of the head of FIG. 1, again showing the range of the extensible support arm between the retracted and extended configurations.

Likewise lateral support means 160 on pivotable base member 146, there is a pair of lateral support means 180 fixed to the upper portion of triangular flanges 176. Lateral support means 160 and 180 are corresponding pivot support means to which are pivotally connected the pair of auxiliary leveling members 150 in a substantially parallel plan alongside the longitudinal axis of first elongate member 148. A first end of double acting hydraulic cylinder 190 is pivotally connected to proximal end 168 to the upper portion of pivotable base member 146 through common pivot 184 transversely encompassing as well both lateral support means 160 and proximal ends 186 of auxiliary leveling members 150. Distal end 192 of hydraulic cylinder 190 is pivotally connected to a pivot support means 194 fixed adjacent to distal end 172 of first elongate member 148. As best shown in FIGS. 12 and 13, when hydraulic cylinder 190 is extended and retracted, in cooperative relation with auxiliary leveling members 150, first and second elongate members 150 and 154 cooperatively extend and retract laterally between a substantially inverted V and U-shaped configuration. Thus, extensible support arm 22 allows a lateral range of travel, for example of about 19.5 inches (49.5 cm) to the chain saw assembly 24.

Figure 16:
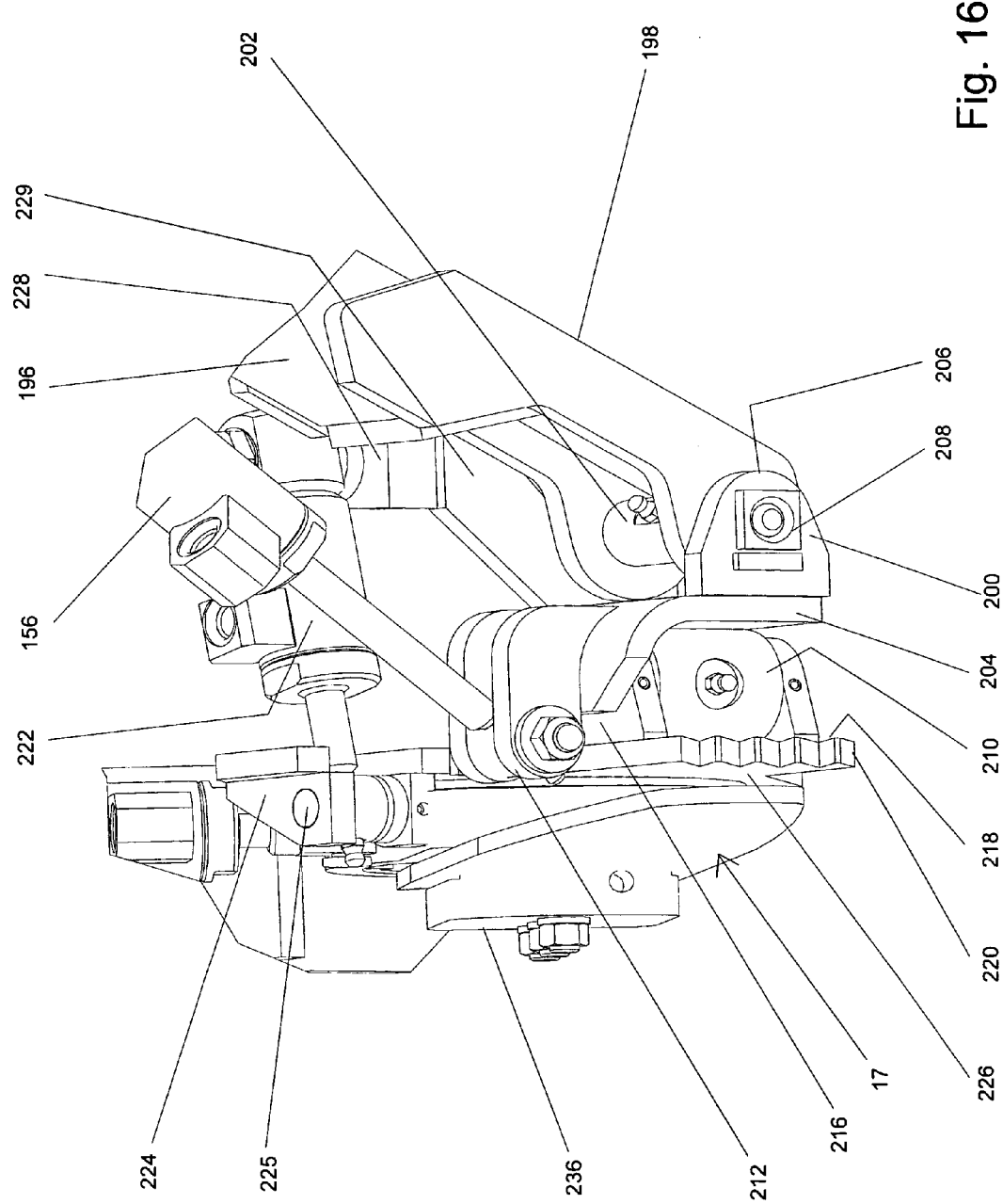
FIG. 16: is an enlarged, fragmentary perspective view of the universal joint linking the distal end of the extensible support arm with the chain saw assembly.
Figure 17:
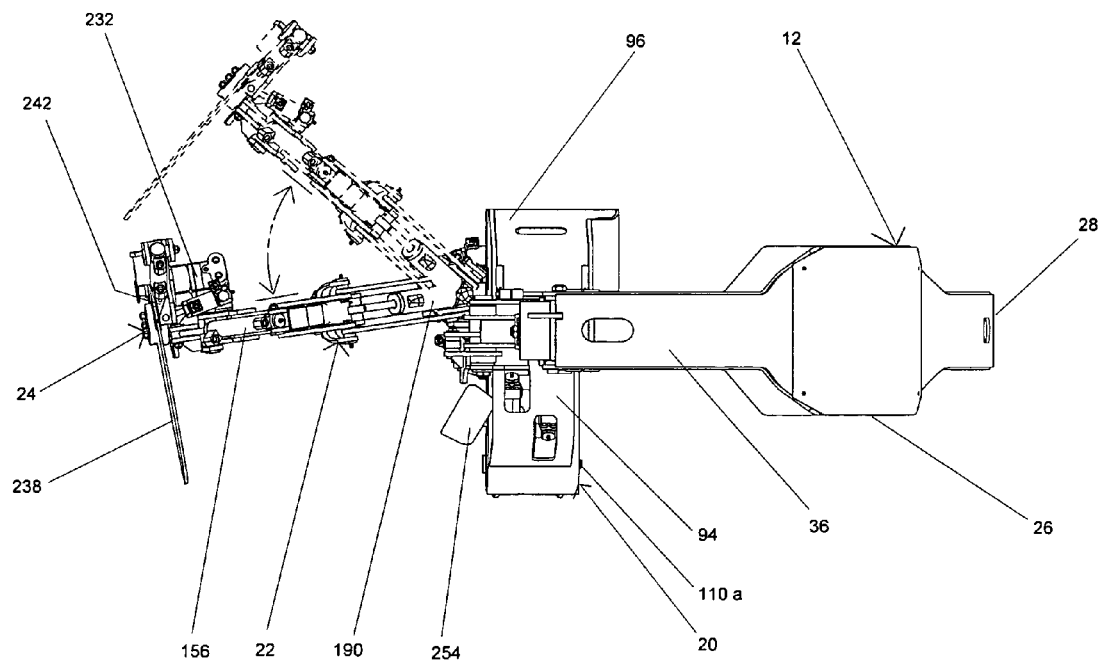
FIG. 17: is a top plan view of the head of FIG. 1, showing the lateral rotational range of the extensible support arm with dependent chain saw assembly.

Therefore, the extensible support arm 22 is configured and operatively coupled to the gripper arm housing 20 in a manner such that the cutting device, and a cutting device mount usable to mount the cutting device to the extensible support arm 22, is movable relative to the gripper arm housing 20 along three mutually perpendicular directions. Also, the extensible support arm 22 is configurable between a retracted configuration and an expanded configuration, the cutting device being located further away from the pair of gripper arms 66a and 66b when the support arm is in the extended configuration than when the support arm is in said retracted configuration FIGS. 15 and 16 show distal end 196 of second elongate member 154 having a pair of oppositely disposed support members 198 joined transversely by an horizontal pivot support sleeve 202 through which is pivotally connected a universal joint assembly 200 comprising a pair of pivot axes disposed substantially normal to each other.

Universal joint assembly 200 is generally defined by a profiled central plate 204 having an inverted L-shaped cross-section, and to which is rigidly fixed on one side a pair of horizontally spaced support means 206 for supporting pivot 208 in coaxial relation within pivot support sleeve 202. On opposite side of central plate 204, relative to support means 206, is rigidly fixed a substantially vertical pivot support sleeve 210, while atop the upper horizontal portion of central plate 204 is rigidly fixed an additional pair of horizontally spaced pivot support means 212. Double acting hydraulic cylinder 156 has one end pivotally connected through pivot support means 212, with the other, opposite end pivotally connected through a pair of pivot support means 214 rigidly fixed adjacent proximal end 178 of second elongate member 154.

Pivotally connected through pivot support sleeve 210 is a pair of vertically spaced pivot support means 216 rigidly fixed to the lower inner side 218 of a substantially vertical mounting-plate 220. Furthermore, as best shown in FIGS. 14 and 16, a double acting hydraulic cylinder 222 has a first end pivotally connected to a vertical pivot support means 224 fixed to the upper outer side 226 of mounting-plate 220, through a lateral U-shaped opening provided in the plate. Opposite end of hydraulic cylinder 222 is pivotally connected to a vertical pivot support means 228 rigidly fixed to the outer end of an angular support member 229 having its lower end rigidly fixed to a lateral side (not shown) of profiled central plate 204.

Vertical mounting-plate 220 serves as a support base through which is transversally mounted, substantially at its center, a chain saw mechanism 230 comprised of an hydraulic rotator 232 on inner side 218, which is fixed perpendicularly to the center of a support collar 234 rotatably mounted within mounting-plate 220. Centrally attached to rotatable support collar 234, on the outer side 226 of vertical mounting-plate 220, there is a guide bar holder 236 with a conventional guide bar and saw chain assembly 238 that are mounted in a substantially parallel plane relative to mounting-plate 220.

Vertically extending above the upper edge of mounting-plate 220, adjacent pivot support means 224, is a pair of horizontally spaced pivot support members 240 extending upwardly, to which is pivotally connected one end of double acting hydraulic cylinder 242. Opposite end of hydraulic cylinder 242 is pivotally connected to a horizontal pivot 244 rigidly fixed to the upper circumferential edge of rotatable support collar 234 (as best shown in FIGS. 19 and 20). It is to be noted that the rotational drive of the output shaft (not shown) of hydraulic rotator 232 is communicated to the central drive mechanism 246 axially through the rotatable support collar 234. Hydraulic ports 248 on hydraulic rotator 232 are for powering the latter.

Figure 7:
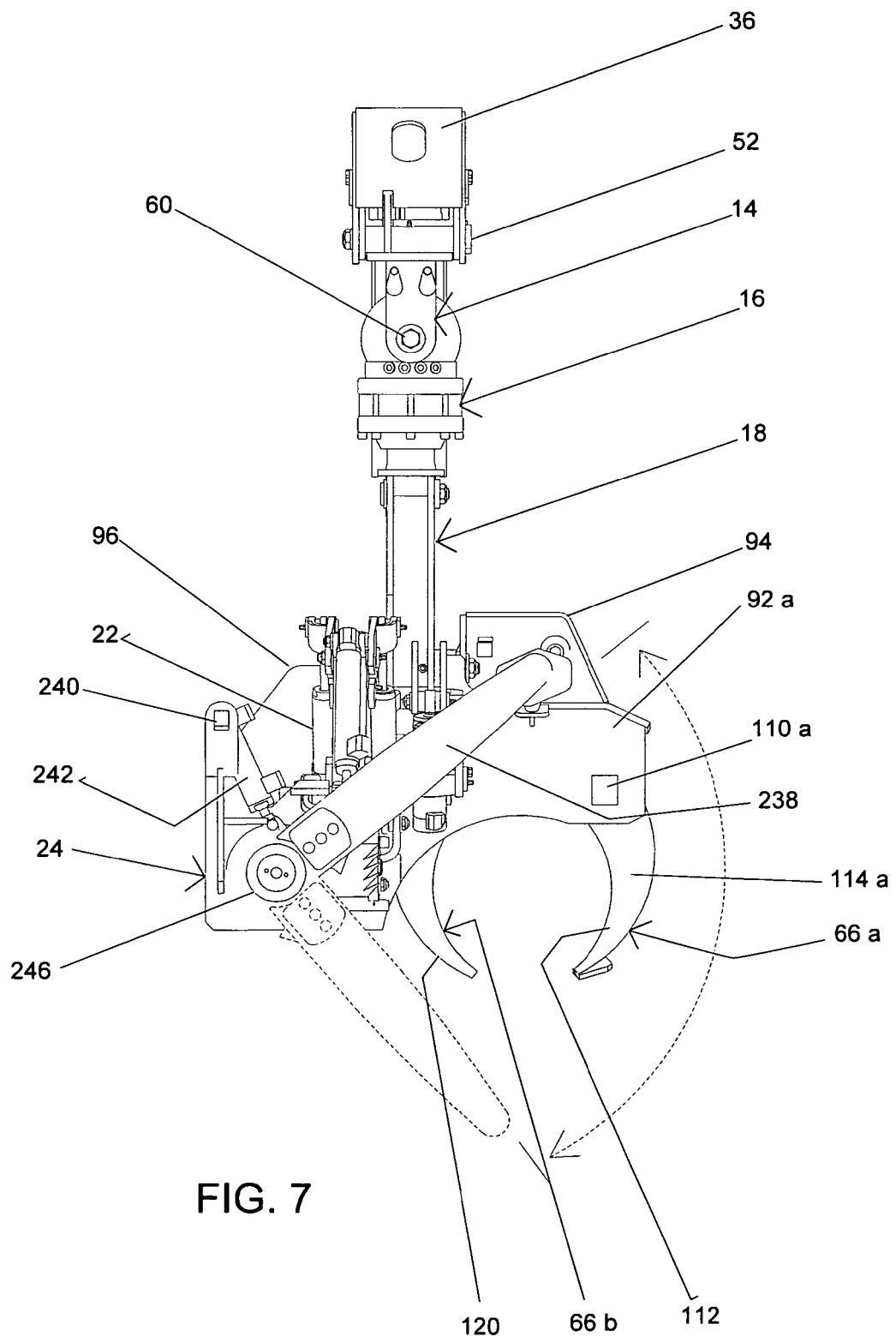
FIG. 7: is a front elevational view of the head of FIG. 1 showing the rotational movement of the chain saw assembly relative to an extensible support arm.
Figure 9:
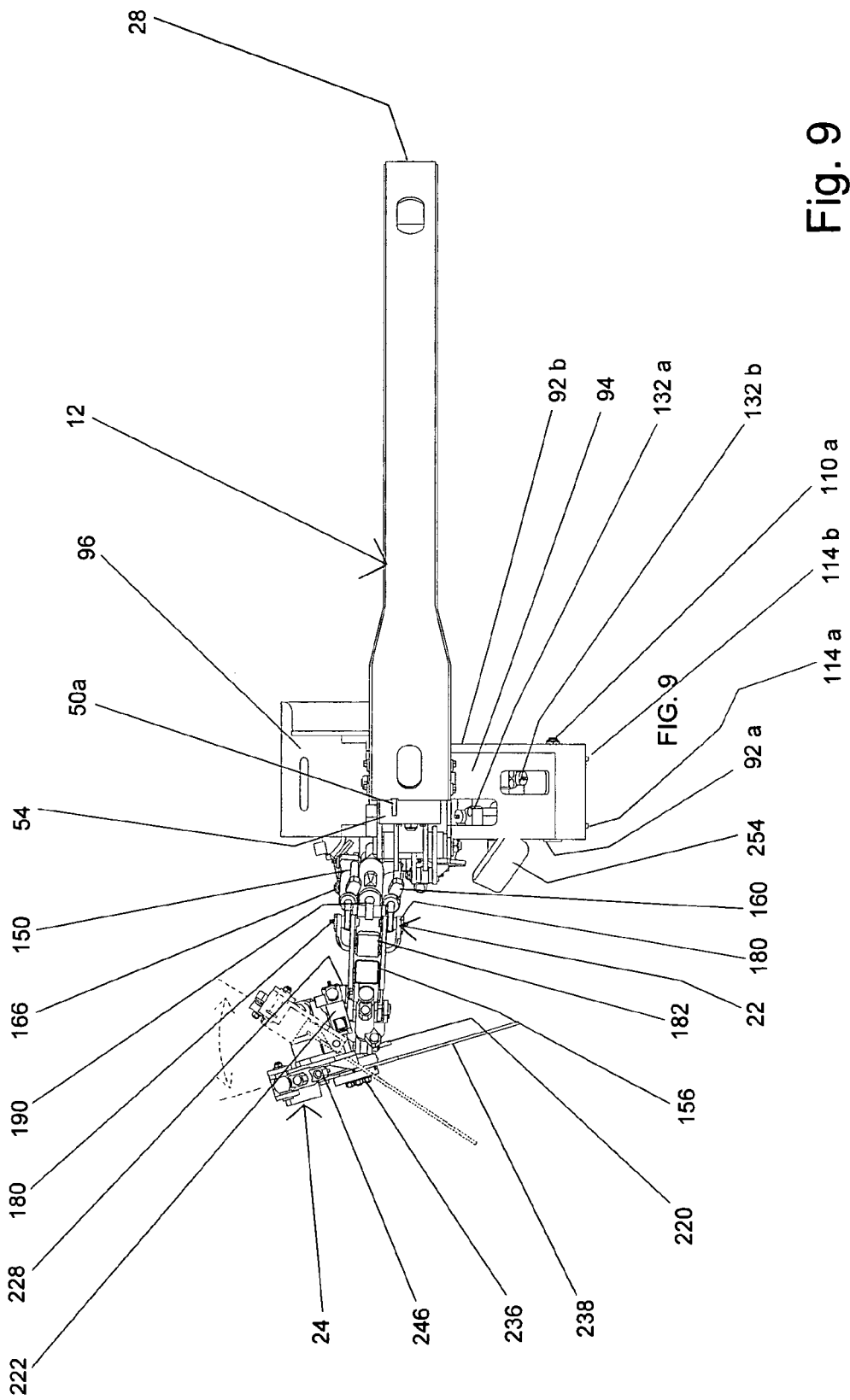
FIG. 9: is a top plan view of the head of FIG. 1, showing the laterally pivoting movement of the chain saw assembly relative to the extensible support arm.
Figure 10:
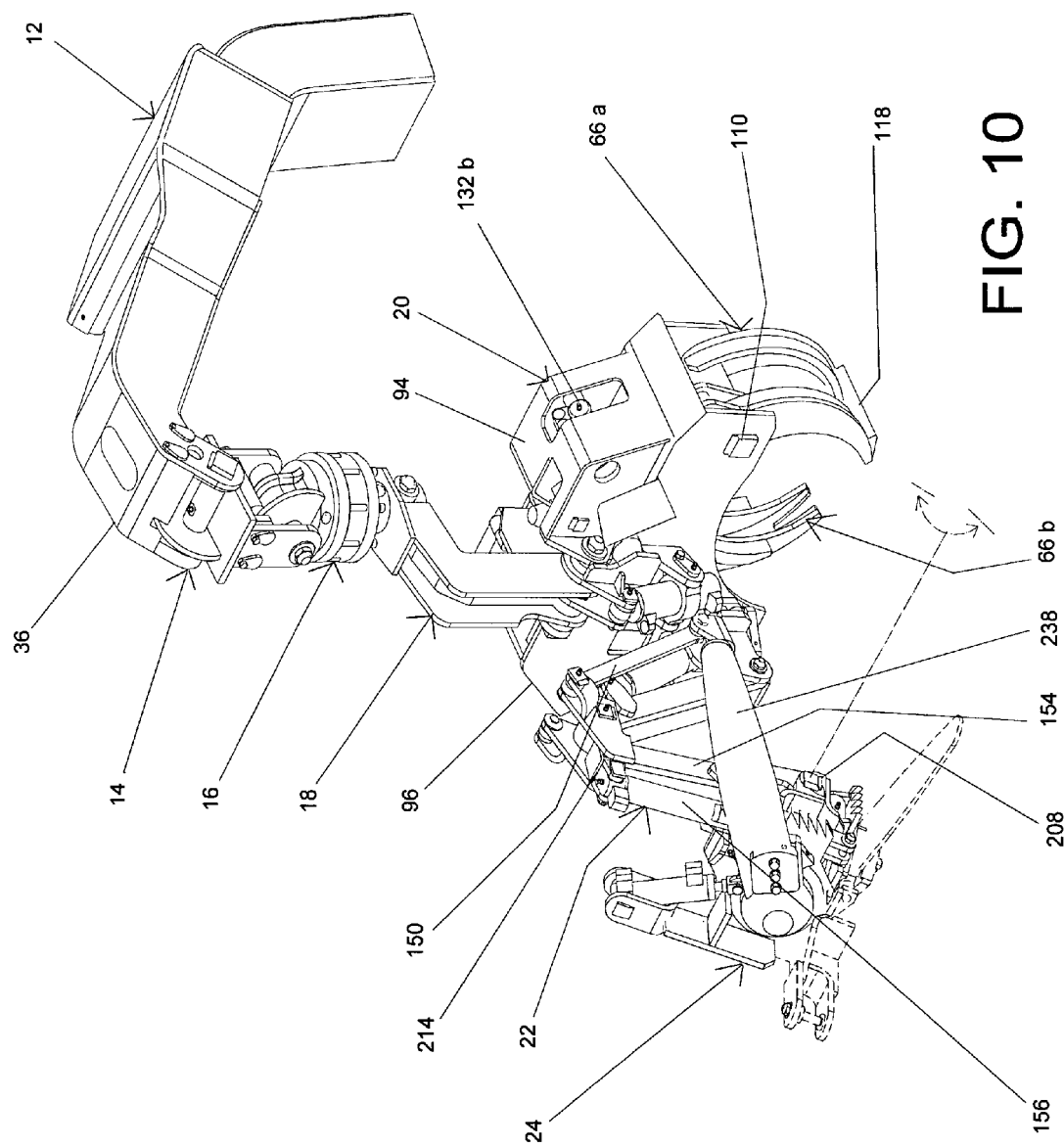
FIG. 10: is a front perspective view of the head of FIG. 1, showing the lateral tilting movement of the chain saw assembly.
Figure 11:
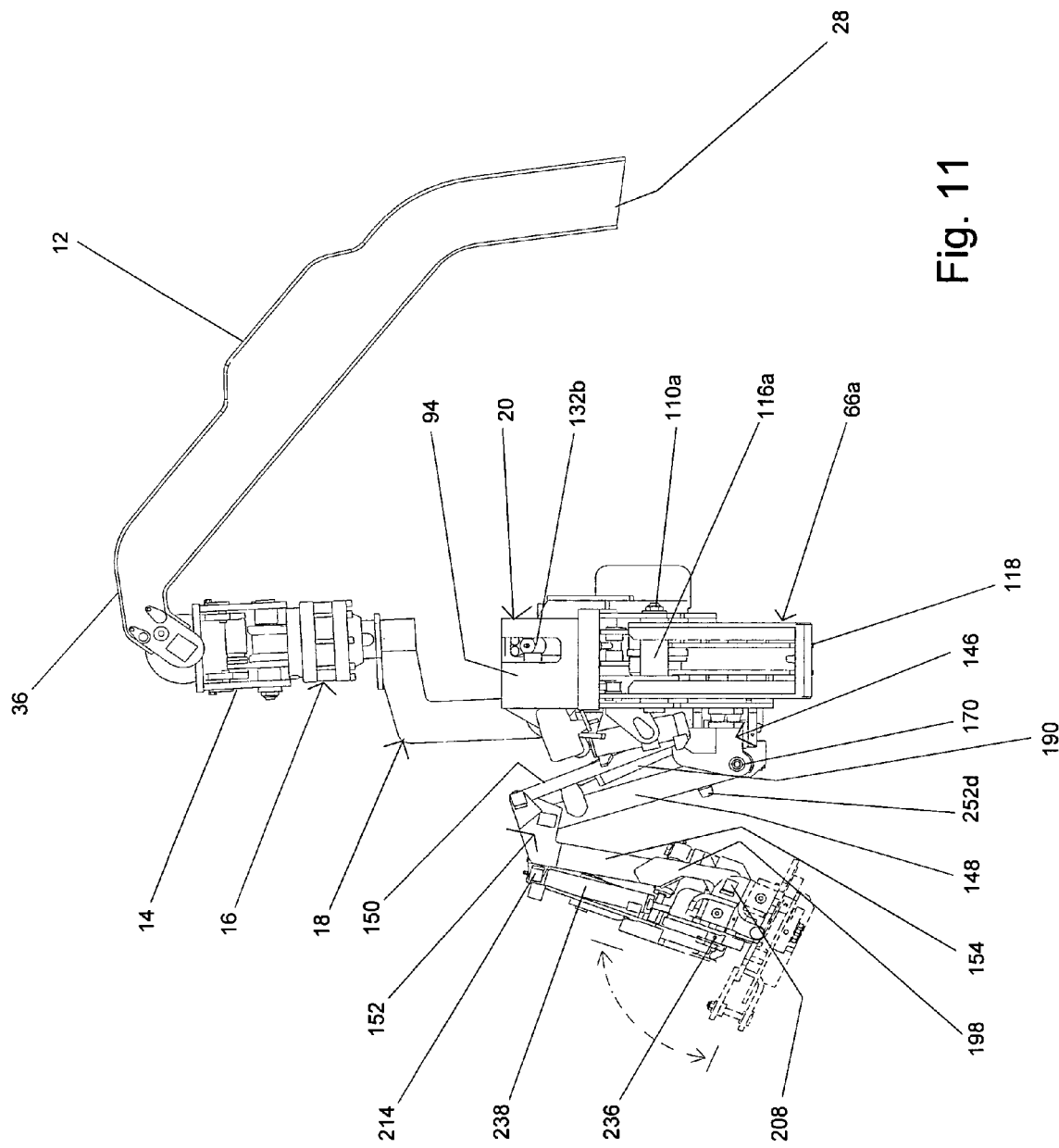
FIG. 11: is a side elevational view of the head of FIG. 1, again showing the lateral tilting movement of the chain saw assembly.

Thus, as best shown through FIGS. 11, 9 and 7 respectively, in some embodiments of the invention, when extended and retracted, hydraulic cylinder 156 causes, chain saw assembly 24 to revolve roughly 90 degrees in a vertical plane around the horizontal axes of pivot 208, hydraulic cylinder 222 causes chain saw assembly 24 to revolve roughly 35 degrees in an horizontal plane around the vertical axes of pivot 225, while hydraulic cylinder 242 causes chain saw mechanism 238 to revolve roughly 90 degrees in a vertical plane around the horizontal axes of rotatable support collar 234.

At this point, it is important to note that each movable component of the attachment head 10, starting from the live double hinge joint 14 down to the tip of the chain saw mechanism 238, has full freedom of movement, independently of the physical position of the other components, individually or as a unit. Also, the extensible support arm 22 includes a cutting device mount 17, which includes the universal joint assembly 200 and the rotatable support collar 234, for mounting a cutting device thereto, the support arm being configured, sized and operatively coupled to the gripper arms housing 20 in a manner such that the cutting device is rotatable relatively to the gripper arms 66a and 66b about three different rotation axes. When the gripper arms 66a and 66b grip a tree, or a portion of a tree, the gripper arms 66a and 66b stabilizes the extensible support arm 22 relatively to the tree and allows for the orientation of the cutting device relatively to the tree by the extensible support arm 22. In some embodiments of the invention, as detailed hereinabove, the orientation of the cutting device relatively to the tree occurs about three mutually perpendicular axes, as allowed by the cutting device mount.

Multiple access holes 250a through 250f found throughout gripper arms housing 20, allow for general inspections and maintenance, as well as access to lubrication ports associated with the various corresponding mechanical assemblies. Access holes 250a and 250b also allow for the coupling of flexible hydraulic hoses (not shown) to hydraulic cylinders 104a and 104b.

As best shown in FIGS. 6, 15 and 22, shock-absorbing bumpers 252a, 252b, 252c and 252d are appropriately disposed to cushion any exceeding movements of the corresponding articulated components. These absorbing pads are preferably made of a resilient material such as rubber and having a substantially prominent shape such as, for example, a frusto-conical shape (as shown).

Preferably, a closed circuit video camera with an auxiliary light source are integrated in a windowed protective enclosure 251 (as shown in FIGS. 3 and 9) that is generally aimed at the work area of extensible support arm 22 and chain saw assembly 24 and, thus, allow the operator to have a remote visual access of the operations on a video monitor positioned, for example, in the control console mounted on the carrier vehicle.

Figure 25:
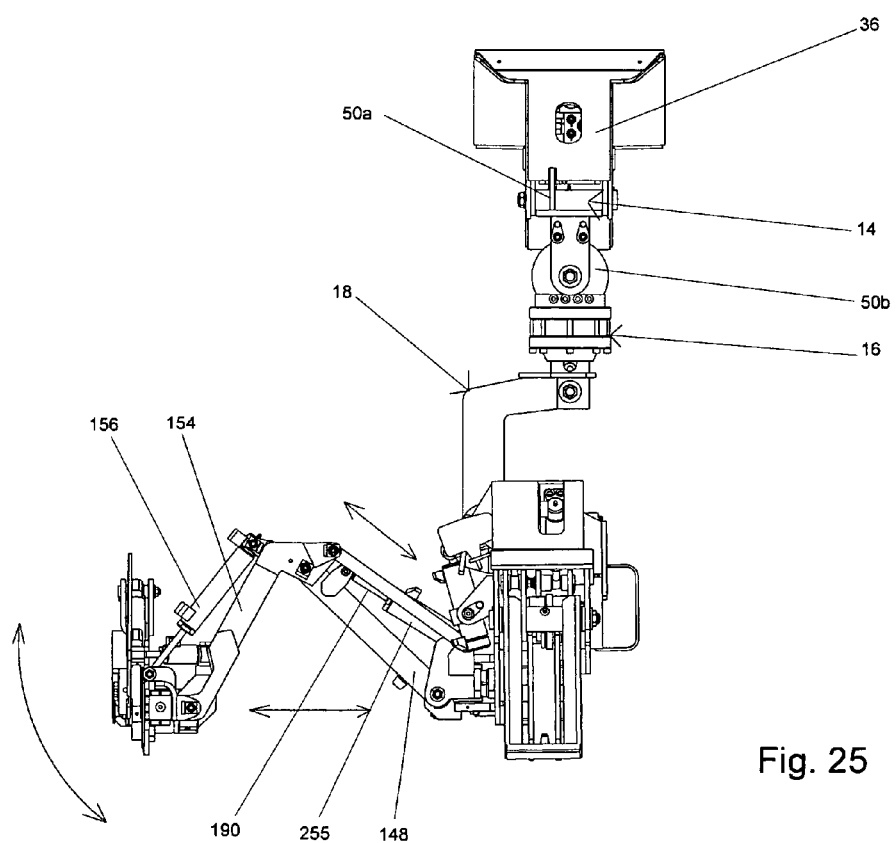
FIG. 25: is a side elevation view of an alternative head having and adjustable leveling member of the extensible support arm.

Although the above description contains many specificities, these should not be construed as limitations on the scope of the invention but as merely providing one illustration of the presently preferred embodiment of this invention. For example:

a) equivalent torque drive elements other than double acting hydraulic cylinders and rotators can be used such as, for example, pneumatic or electric torque drive elements;

b) the hydraulic tree pruning and trimming head attachment can be dimensioned as a relatively larger and more heavy duty version, or as a much smaller version made of ultra-light materials;

c) chain saw mechanism can be of any other type of tree cutting device such as, for example, a round saw or a band saw.

d) the leveling member 150 could be replace as shown in FIG. 25 by a leveling hydraulic cylinder 255 in other to modified the level of the extensible support arm at will.

e) one or more degrees of freedom provided by the various articulations included in the head 10 may be omitted by omitting from the head 10 the corresponding articulations.

Figure 26:
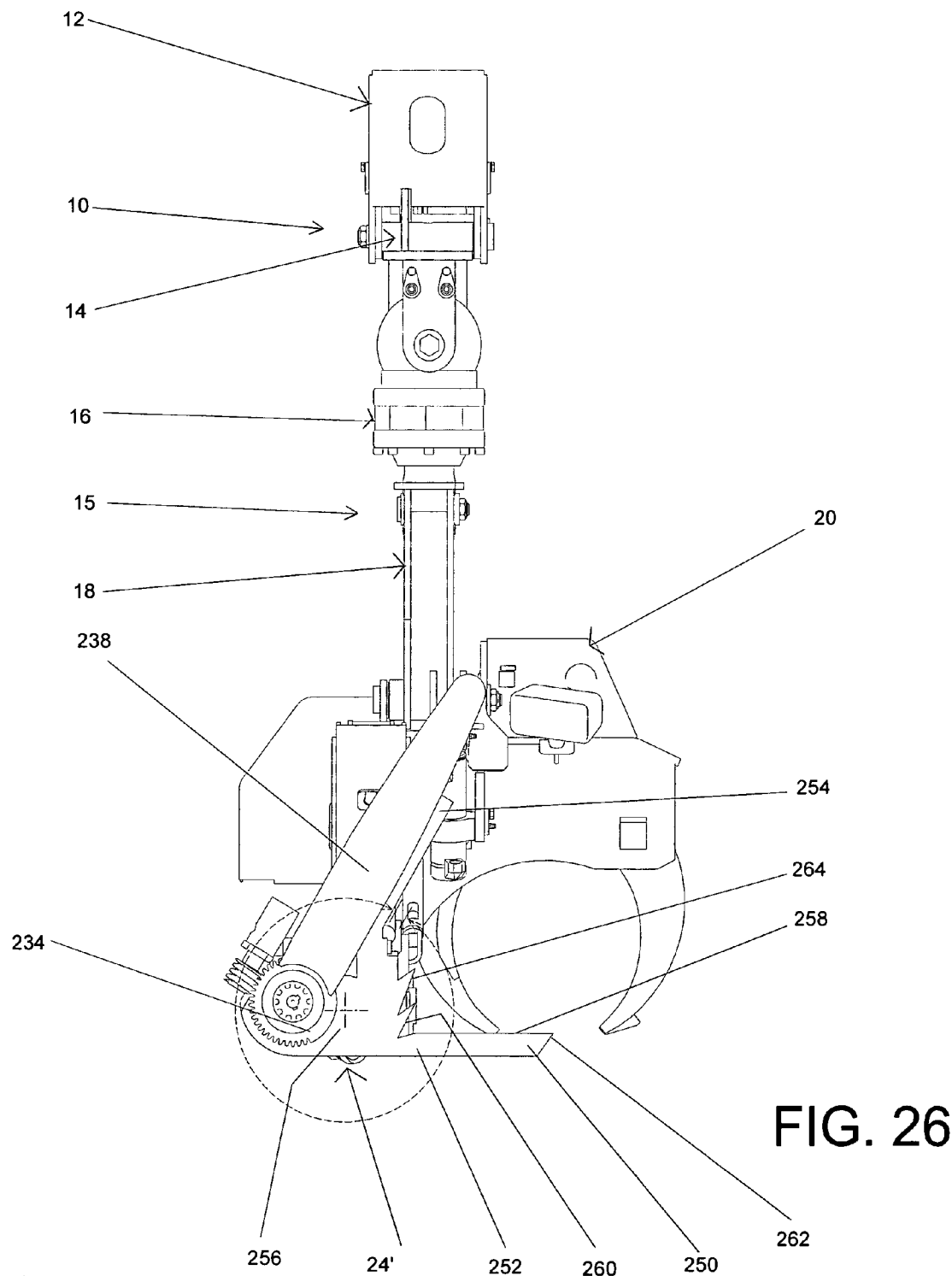
FIG. 26: is a side elevation view of a head in accordance with an alternative embodiment of the invention.
Figure 27:
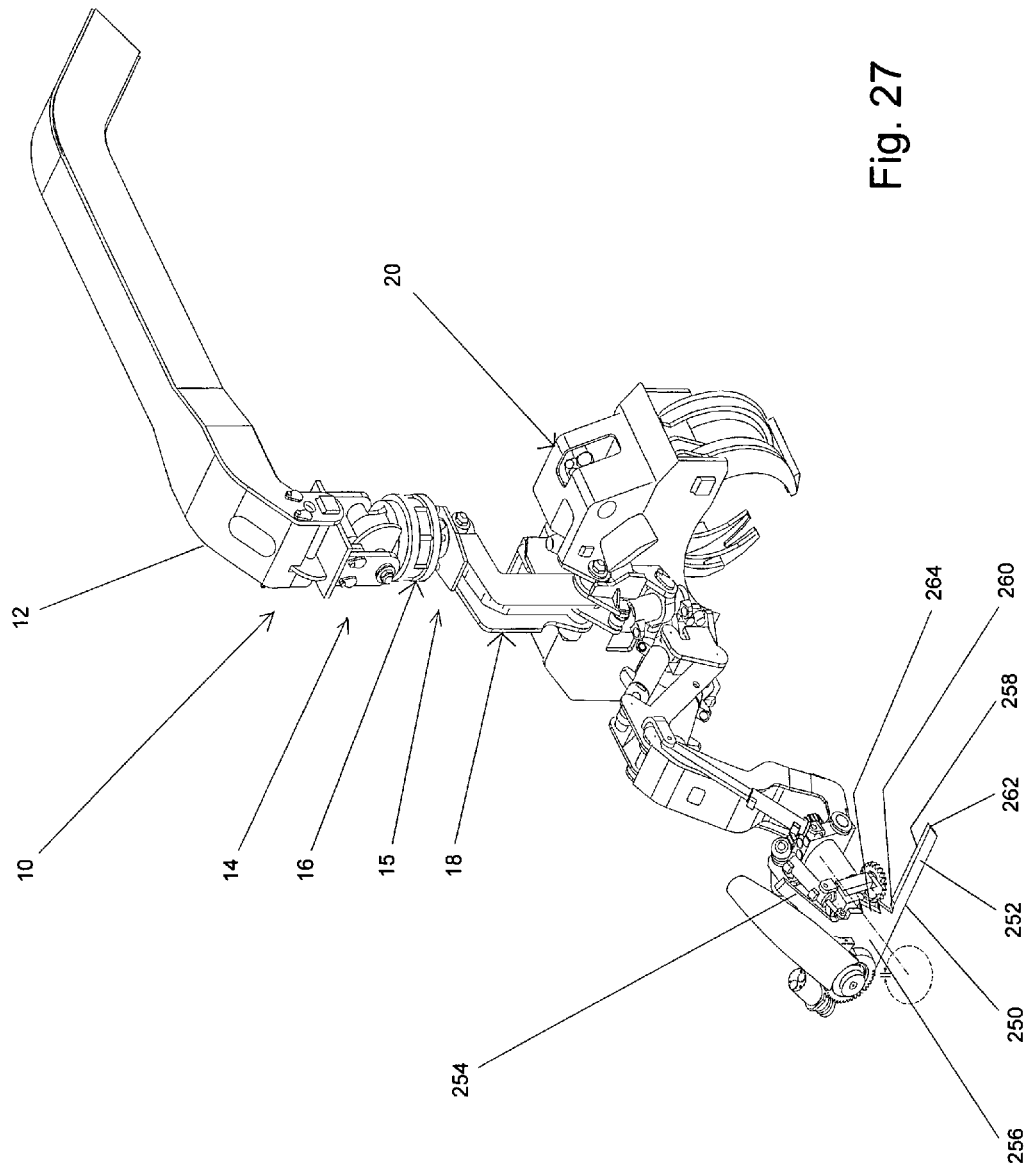
FIG. 27: is a front perspective view of the head of FIG. 26.

In some embodiments of the invention, as seen in FIGS. 26 and 27, the chain saw assembly 24' includes a stabilizing component 250 extending substantially adjacent the chain saw for stabilizing said tree as the chain saw mechanism 230 is pivoted by the rotatable support collar 234 to cut the tree. The stabilizing component 250 replaces the vertical mounting-plate 220 and is similarly mounted to the remainder of the head 10. Typically, the stabilizing component 250 is substantially plate-shaped and extends substantially parallel to the plane into which the chain saw mechanism 230 is pivoted by the rotatable support collar 234 (not shown in FIGS. 26 and 27).

The stabilizing component 250 defines a first stabilizing section 252 having a substantially elongated configuration, a second stabilizing section 254 having a substantially elongated configuration and a toothed section 256 extending therebetween. The first and second stabilizing sections are angled relatively to each other and define a gap 258 extending therebetween. The gap 258 defines a gap proximal end 260 and a substantially opposed gap distal end 262. The gap proximal end 260 is substantially adjacent the toothed section 256, which defines teeth 264 extending thereinto.

In use, a tree or a branch to cut (not shown in the drawings) is inserted between the first and second stabilizing sections 252 and 254 and, if desired, the teeth 264 are engaged into the tree or branch. Then, the chain saw mechanism 230 is used to cut though the tree or branch while the stabilizing component 250 stabilizes the tree or branch relative to the chain saw mechanism 230. To that effect, the tree or branch is typically positioned between the chain saw mechanism 230 and one of the first and second stabilizing sections 252 and 254.

While a specific configuration of the chain saw assembly 24 has been described hereinabove, the reader skilled in the art will readily understand that many alternative configurations are within the scope of the invention. For example, chain saw assemblies 24 having more than 3 degrees of freedom are also within the scope of the claimed invention.

Figure 28:
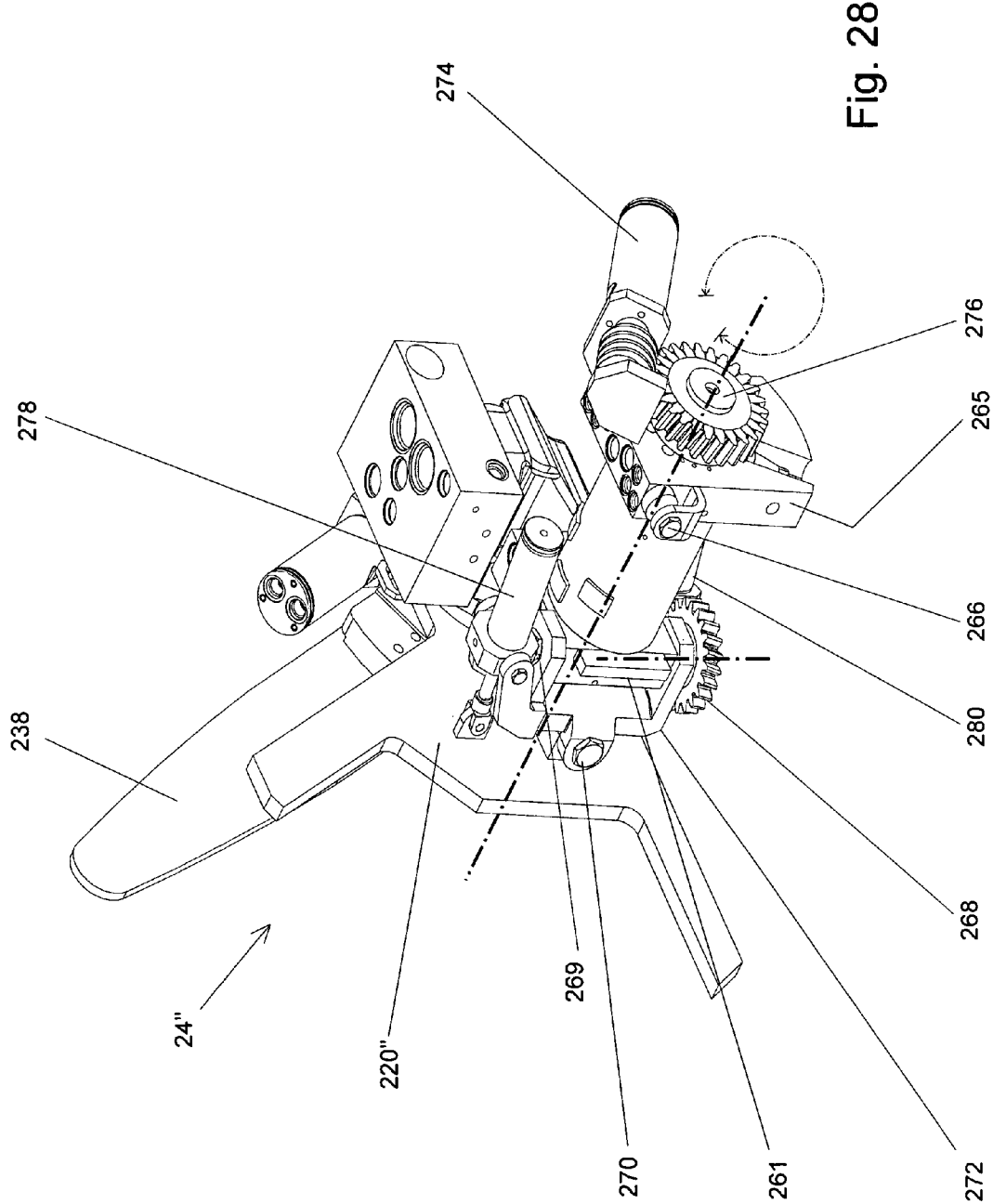

For example, the chainsaw assembly 24" shown in FIG. 28 is movable about 5 degrees of freedom. The chainsaw assembly 24" includes a base 265 pivotally mountable to the extensible support arm 22. Similarly to the chainsaw assembly 24, although not shown in the drawings, the base 265 is mountable to the distal end 196 of the second elongate member 154 so as to be pivotable about the horizontal pivot support sleeve 202 and an actuator, such as an hydraulic cylinder, is usable to pivot the chainsaw assembly 24" about the horizontal pivot support sleeve 202.

The remainder of the chainsaw assembly 24" is pivotally mounted to the base 265 so as to be rotatable vertically about the base 265 using an hydraulic motor 274 coupled to a gear 276. Typically, this provides a 360 degrees motion that allows for orienting the chain saw mechanism 238 vertically at any desired angle, which facilitates access to branches to cut. In addition, the chain saw mechanism 238 still rotates vertically on its own as in the chain saw assembly 24 to cut the tree. The last two degrees of freedom are provided by a universal joint 272 defining a horizontal pivot 270 and a vertical pivot 269. The mounting plate 220" is pivotally mounted to the universal joint 272 so as to be pivotable about the horizontal pivot 270 through an eccentrically mounted hydraulic cylinder 278. Motion about the vertical pivot 269 is provided by a hydraulic motor 280 engaging a gear 268 that is coaxially attached to the vertical pivot 269. The universal joint 272 is mounted to the base 265 so as to be rotatable vertically by the hydraulic motor 274.

Although the present invention has been described hereinabove by way of preferred embodiments thereof, it can be modified, without departing from the spirit and nature of the subject invention as defined in the appended claims.

What is claimed is:

1. An apparatus for gripping a tree, said apparatus being attachable to a carrier boom, said apparatus being usable with a cutting device for cutting a portion of said tree, said apparatus comprising:

a body, said body being mountable to said carrier boom;

a pair of gripper arms mounted to said body, said pair of gripper arms being selectively movable between an open configuration in which said tree is insertable therebetween and a closed configuration in which said pair of gripper arms is able to grip said tree therebetween; and a support arm operatively coupled to said body for supporting said cutting device, said support arm including a cutting device mount for mounting said cutting device thereto, said support arm being configured, sized and operatively coupled to said body in a manner such that said cutting device is rotatable relatively to said pair of gripper arms about three different rotation axes;

whereby, when said pair of gripper arms grips said tree, said pair of gripper arms stabilizes said support arm relatively to said tree and allows for the orientation of said cutting device relatively to said tree by said support arm.

2. An apparatus as defined in claim 1, wherein said three different rotation axes are mutually perpendicular to each other.

3. An apparatus as defined in claim 1, wherein said support arm is configurable between a retracted configuration and an extended configuration, said cutting device mount being located further away from said pair of gripper arms when said support arm is in said extended configuration than when said support arm is in said retracted configuration.

4. An apparatus as defined in claim 1, further comprising a live hinge joint attachable to said carrier boom and operatively coupled to said body for allowing said body to substantially freely pivot about said live hinge joint relative to said carrier boom when said live hinge joint is attached to said carrier boom.

5. An apparatus as defined in claim 4, further comprising a brake assembly for selectively applying a braking force onto said live hinge joint to resist pivotal movements of said live hinge joint.

6. An apparatus as defined in claim 4, wherein said live hinge joint is a live double hinge joint allowing said body to substantially freely pivot about two different live hinge axes relative to said carrier boom when said live double hinge joint is attached to said carrier boom.

7. An apparatus as defined in claim 6, wherein said two different live hinge axes are substantially perpendicular to each other.

8. An apparatus as defined in claim 7, further comprising a bidirectional rotator coupling said live double hinge joint and said body to each other, said bidirectional rotator being selectively rotatable about a rotator axis, said rotator axis being substantially perpendicular to both of said two different live hinge axes.

9. An apparatus as defined in claim 8, wherein said pair of gripper arms is operatively coupled to said bidirectional rotator so as to be pivotable about a rotator-to-gripper arms axis substantially perpendicular to said rotator axis.

10. An apparatus as defined in claim 1, wherein said pair of gripper arms includes a first gripper arm, said first gripper arm defining an aperture extending therethrough, and a second gripper arm, said first and second gripper arms being configured and dimensioned so that said second gripper arm freely passes, at least in part, through said aperture as said gripper arms are moved towards said closed configuration.

11. An apparatus as defined in claim 1, further comprising a synchronizing element for synchronizing the movements of said gripper arms relative to each other as said gripper arms are moved between said open and closed configurations.

12. An apparatus as defined in claim 1, wherein said body includes a gripper arms housing, said pair of gripper arms being mounted to said gripper arms housing, and a spacing element extending between said gripper arms housing and said carrier boom when said body is mounted to said carrier boom, said spacing element being pivotally mounted to said gripper arms housing.

13. An apparatus as defined in claim 12, further comprising an actuator operatively coupled to said gripper arms housing and to said spacing element for selectively pivoting said gripper arms housing relative to said spacing element.

14. An apparatus as defined in claim 12, wherein said support arm is operatively coupled to said gripper arms housing so as to be jointly pivotable therewith relative to said spacing element.

15. An apparatus as defined in claim 1, wherein said support arm is configured and operatively coupled to said body in a manner such that said cutting device mount is movable relative to said body along three mutually perpendicular directions.

16. An apparatus for gripping a tree, said apparatus comprising:
    a carrier boom;
    a body mounted to said carrier boom;
    a pair of gripper arms mounted to said body, said pair of gripper arms being selectively movable between an open configuration in which said tree is insertable therebetween and a closed configuration in which said pair of gripper arms is able to grip said tree therebetween;
    a support arm mounted to said body, said support arm including a cutting device mount;
    a cutting device for selectively cutting a portion of said tree, said cutting device being mounted to said cutting device mount;
    said support arm being configured, sized and operatively coupled to said body in a manner such that said cutting device is rotatable relative to said pair of gripper arms about three different rotation axes;
    whereby, when said pair of gripper arms grips said tree, said pair of gripper arms stabilizes said support arm relatively to said tree and allows for the orientation of said cutting device relatively to said tree by said support arm.

17. An apparatus as defined in claim 16, further comprising an arched boom adaptor attached to said carrier boom, said arched boom adaptor defining a proximal end and a substantially opposed distal end, said body being suspended from said arched boom adaptor substantially adjacent said distal end.

18. An apparatus as defined in claim 16, further comprising a vehicle, said carrier boom being mounted to said vehicle.

19. An apparatus as defined in claim 16, wherein said cutting device includes a chain saw assembly.

20. An apparatus as defined in claim 19, wherein said chain saw assembly includes a chain saw mechanism pivotably mounted to said cutting element mount, said apparatus further comprising a stabilizing component extending substantially adjacent to said chain saw assembly for stabilizing said tree relative to said chain saw assembly as said chain saw mechanism is pivoted to cut said tree.

* * * * *